United States Patent [19]
Jerome

[11] Patent Number: 5,466,116
[45] Date of Patent: Nov. 14, 1995

[54] METHOD FOR UNLOADING CONTENT OF MULTILAYER CONTAINERS

[76] Inventor: Wallace H. Jerome, 1480 E. Maple Ave., Barron, Wis. 54812

[21] Appl. No.: 328,890

[22] Filed: Oct. 25, 1994

Related U.S. Application Data

[62] Division of Ser. No. 33,767, Mar. 18, 1993, Pat. No. 5,388,948.

[51] Int. Cl.$^6$ .......................... G65G 65/04; G65G 65/34
[52] U.S. Cl. .......................... 414/786; 414/425; 414/391; 414/470
[58] Field of Search .................................. 414/786, 501, 414/471, 470, 425, 422, 421, 419, 391, 390; 298/17.7, 17.5, 18, 13

[56] References Cited

U.S. PATENT DOCUMENTS

| | | | |
|---|---|---|---|
| 1,066,450 | 7/1913 | Pomeroy. | |
| 1,657,076 | 1/1928 | Fitch. | |
| 1,907,457 | 5/1933 | Stevenson | 414/425 X |
| 1,940,193 | 12/1933 | Tucker | 298/13 |
| 2,562,539 | 7/1951 | Ellis et al. | 214/83.36 |
| 2,626,698 | 1/1953 | Appel | 198/65 |
| 3,234,915 | 2/1966 | Sanders | 119/97 |
| 3,260,239 | 7/1966 | Sanders | 119/97 |
| 3,782,398 | 1/1974 | Powell et al. | 134/133 |
| 3,863,781 | 2/1975 | Butzow et al. | 214/62 |
| 3,895,727 | 7/1975 | Rucker | 214/85 |
| 4,084,714 | 4/1978 | Williams | 214/515 |
| 4,215,654 | 8/1980 | Parker, Jr. | 119/97 |
| 4,242,029 | 12/1980 | Musgrave | 414/413 |
| 4,272,863 | 6/1981 | Parker, Jr. | 17/44.1 |
| 5,108,345 | 4/1992 | Harben, III et al. | 452/183 |

OTHER PUBLICATIONS

P. 39 from *Turkey World* (Jan., Feb., 1992) re turkey harvester of Bright Coop, Inc.
Two–page flier of Bright Coop, Inc., on the Bright Poultry Cage.
Two–page flier of Lanson Industries, Inc., on its poultry container.
Four–page brochure on poultry cages of Anglia Autoflow Ltd.
One–page flier on fold–out turkey coops of Koechner Mfg., Co.
Three–page brochure of Carfed on containers sold under its Giant® brand.
P. 44 of *Boiler Industry* (Oct. 1992) re Cage Dumpter of Bright Coop, Inc.
Two–page flier of Tamdev Ltd. on its APS4000 chicken unloading system.

*Primary Examiner*—Michael S. Huppert
*Assistant Examiner*—James Eller
*Attorney, Agent, or Firm*—Merchant, Gould, Smith, Edell, Welter & Schmidt

[57] ABSTRACT

An improved method and apparatus for emptying a load of multilayer container columns is disclosed. An improved multilayer container column construction includes a plurality of vertically aligned and stacked containers connected to one another by hinges along their lower front edges. The containers have lift arms connected to their back sides so that they can be lifted forward about their hinged edges for emptying their contents through discharge gate sides. Automated gate opening apparatus is provided for selectively opening the container gates. Automated lifting apparatus, generally located at a processing plant, is configured to sequentially tilt the containers of the container column load while still on the transport truck, to systematically gently unload the container contents, one level at a time into an accompanying discharge collector.

23 Claims, 29 Drawing Sheets

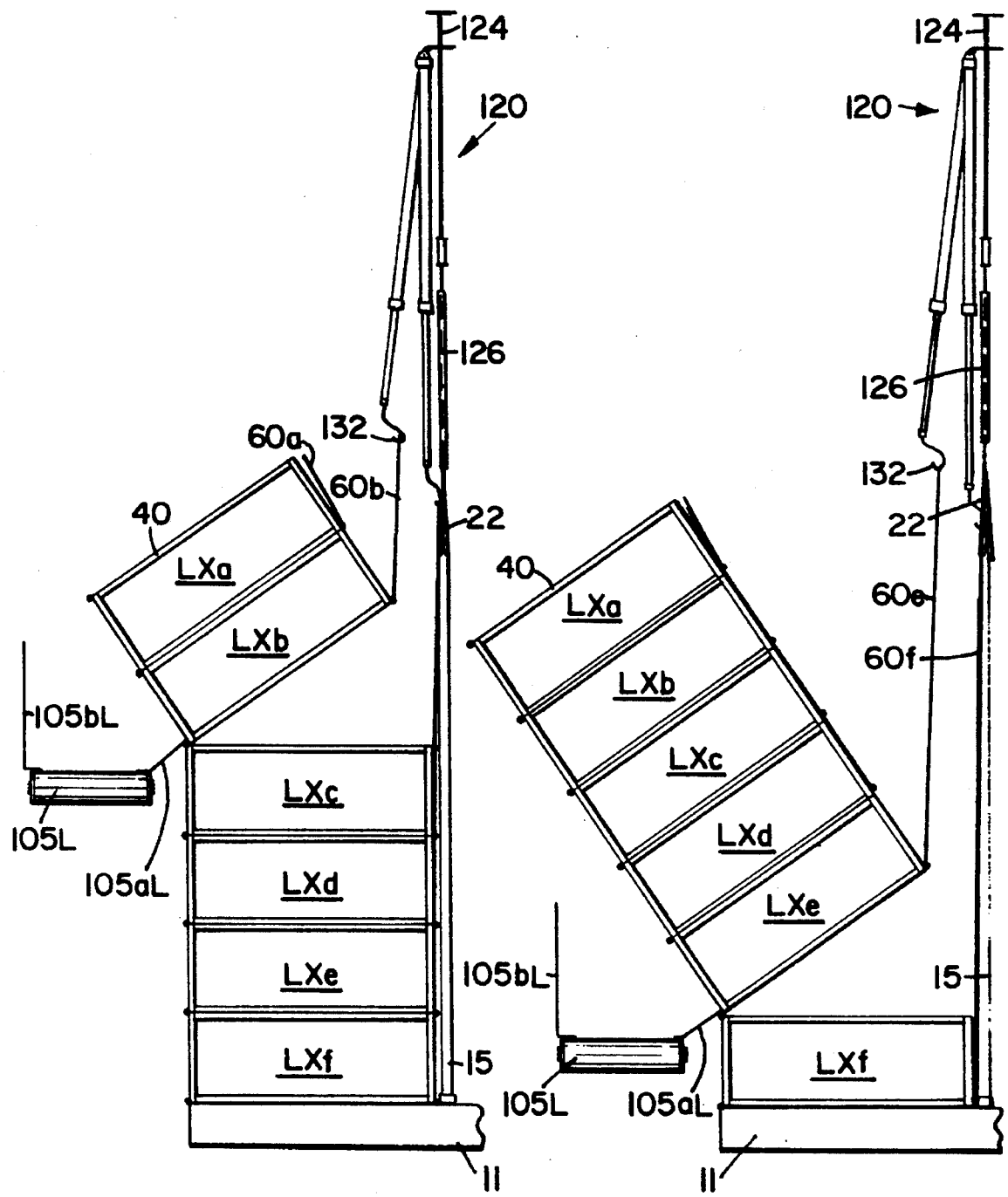

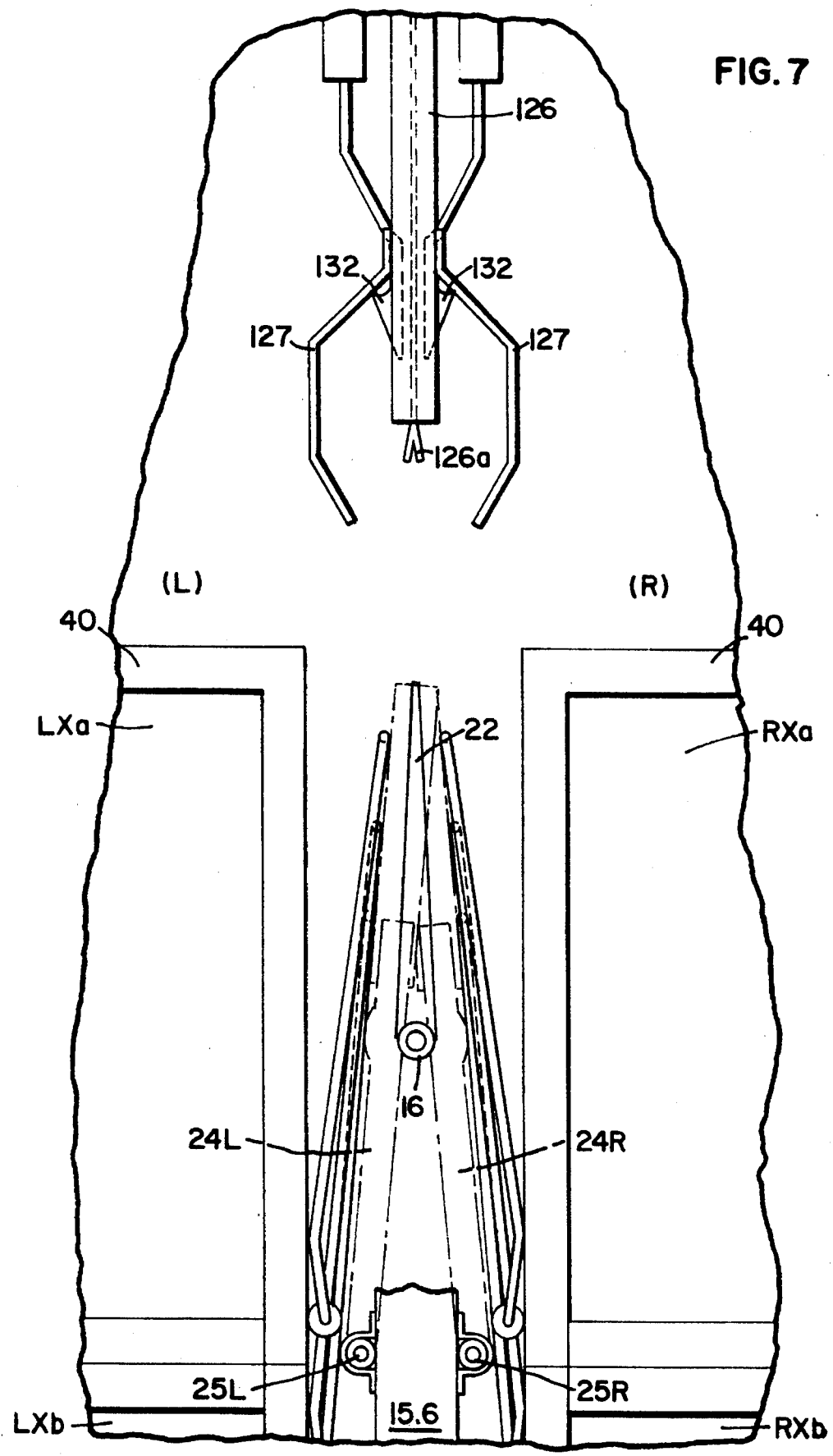

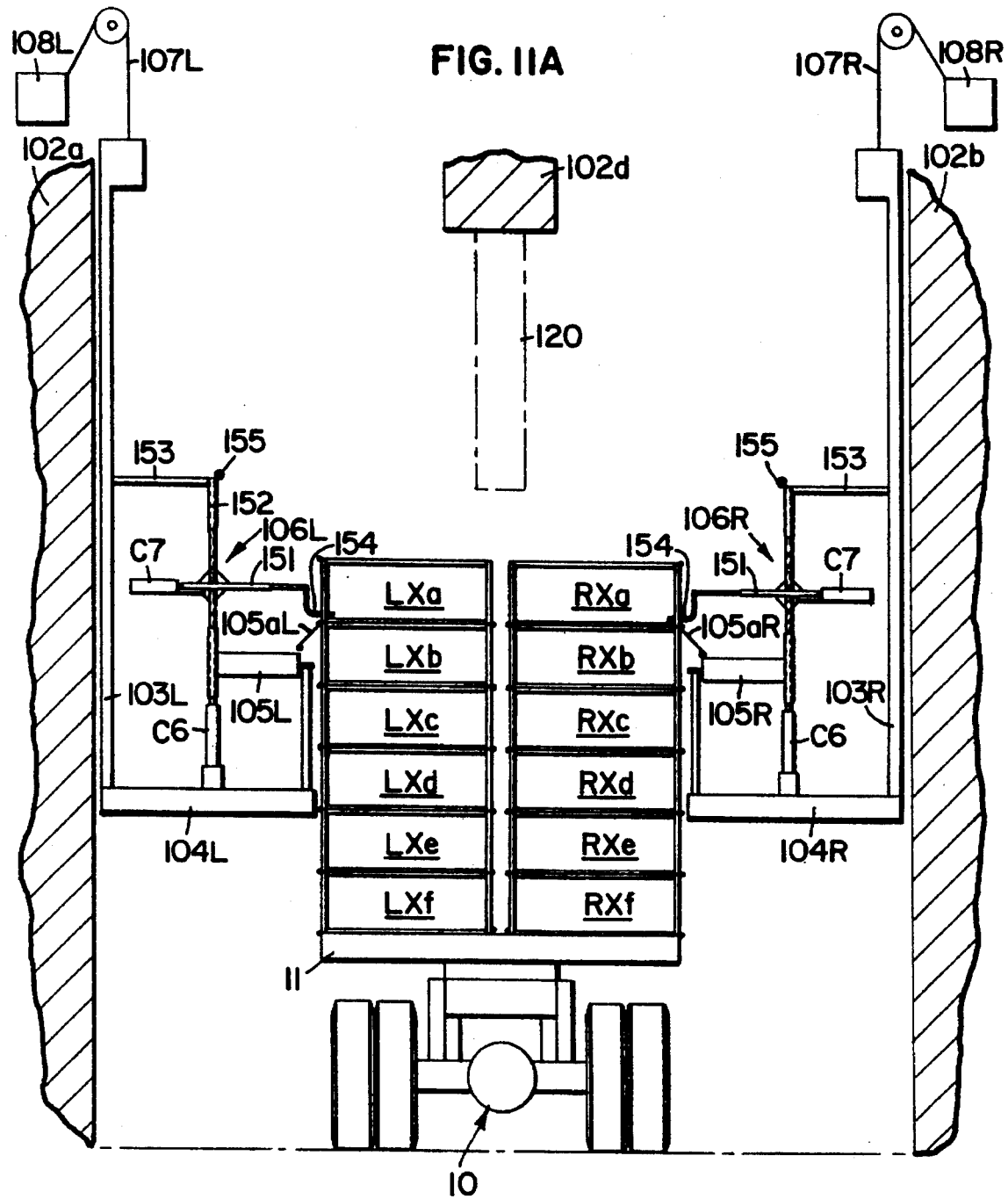

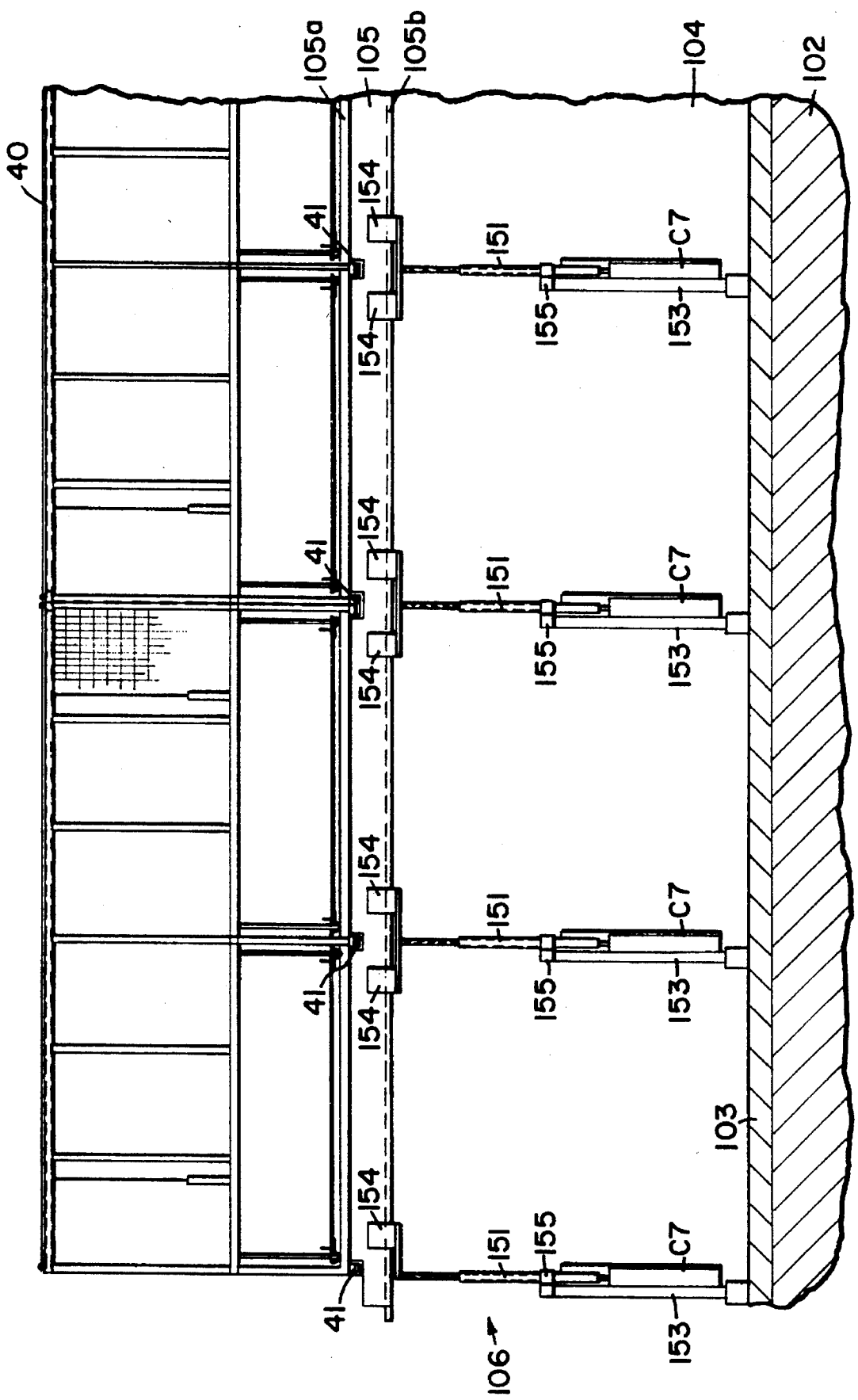

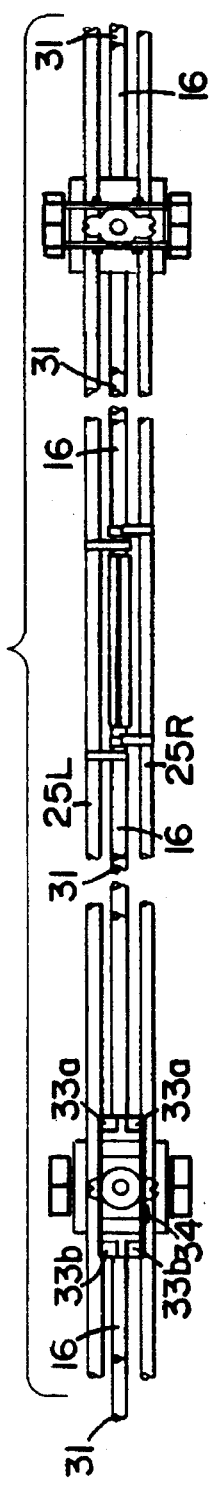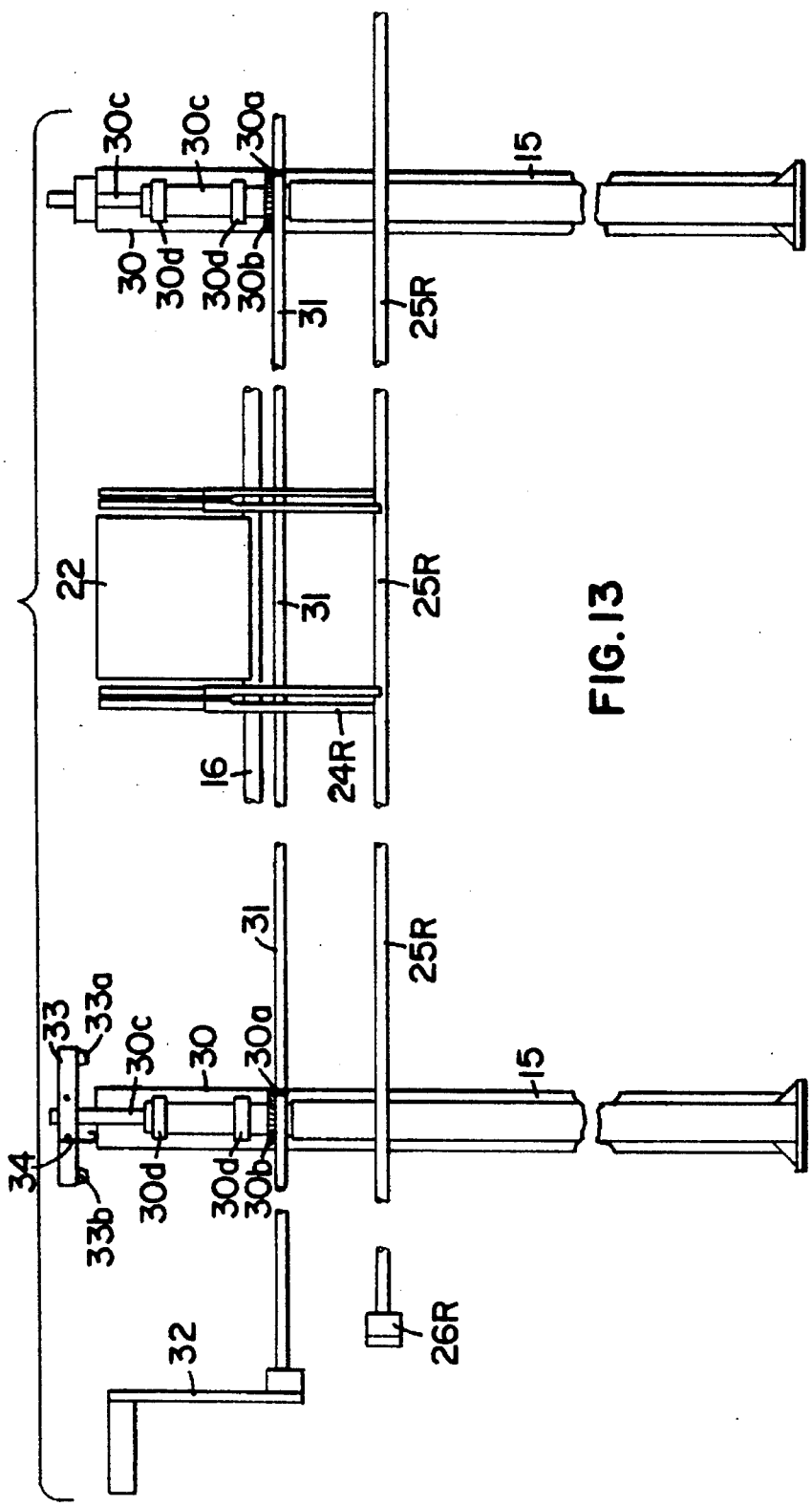

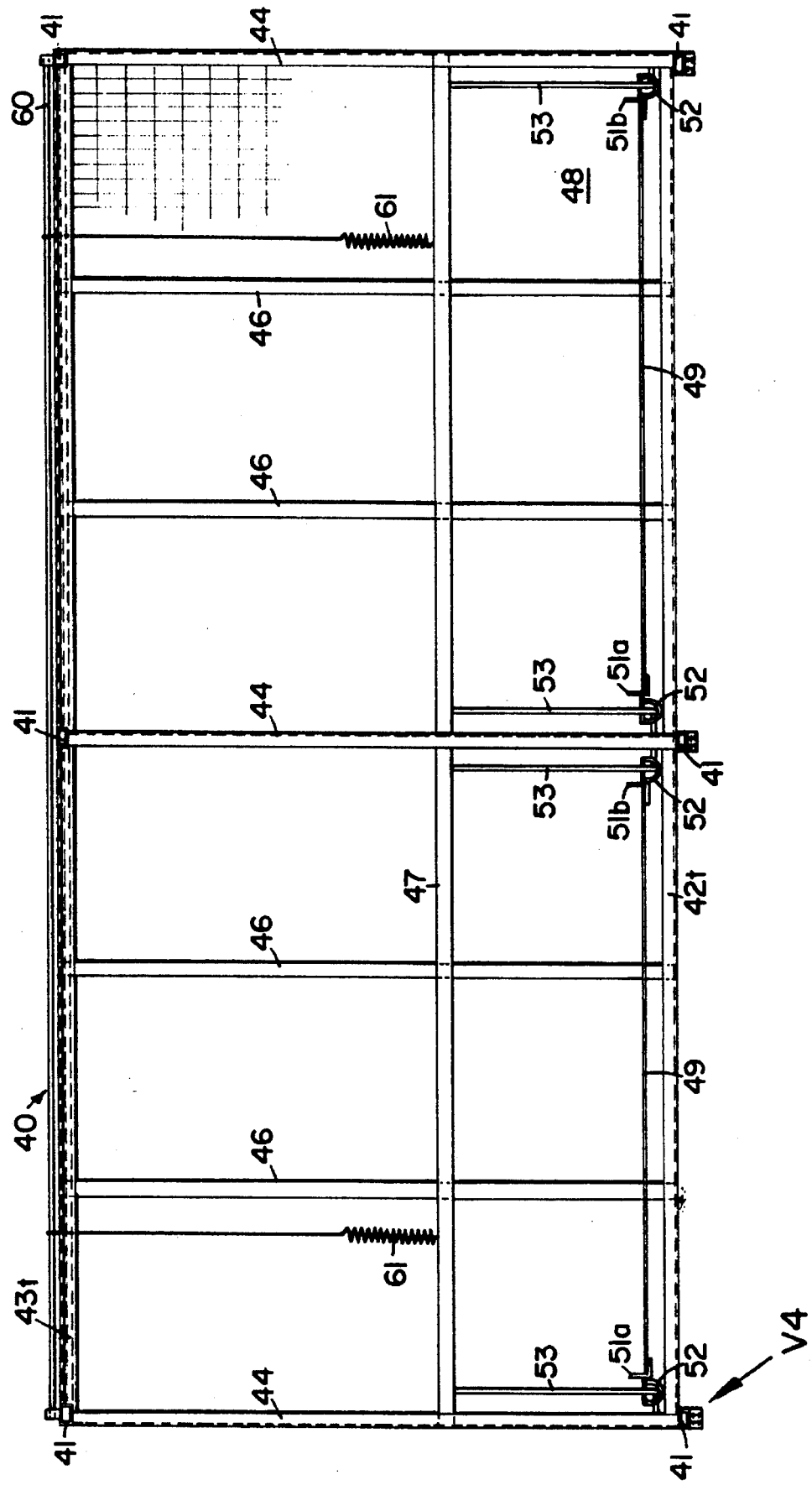

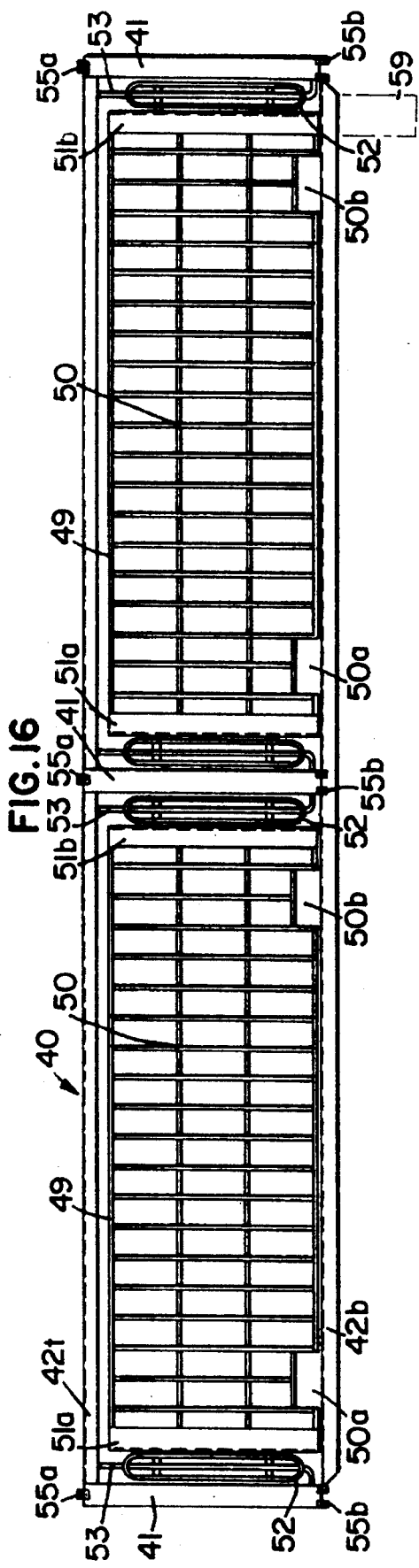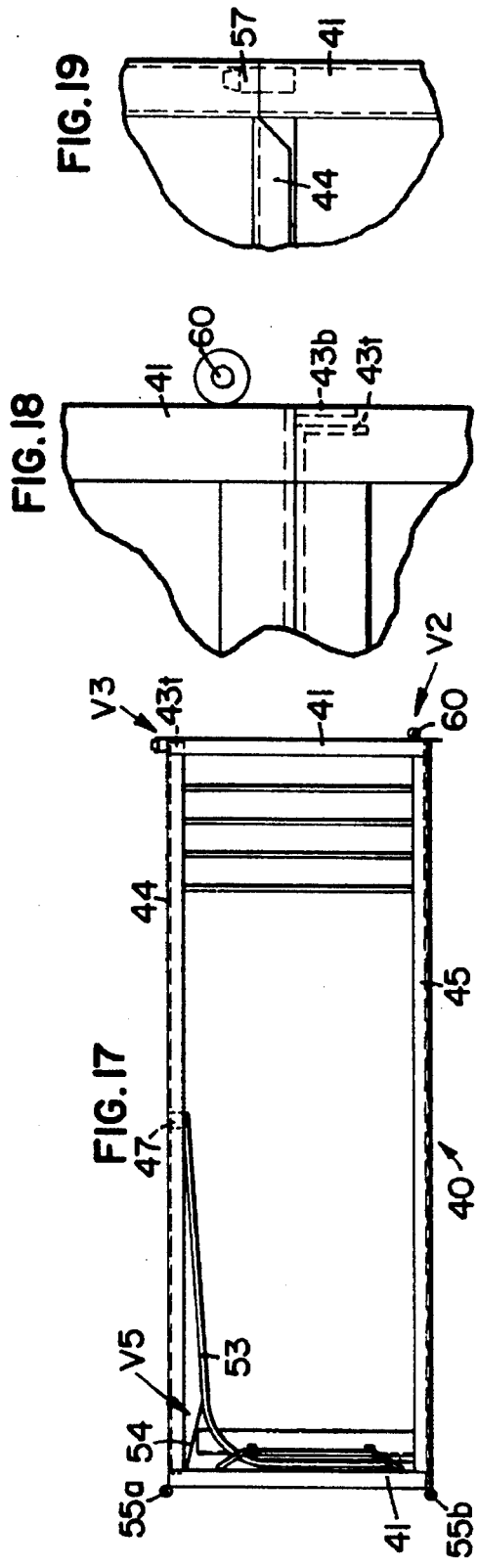

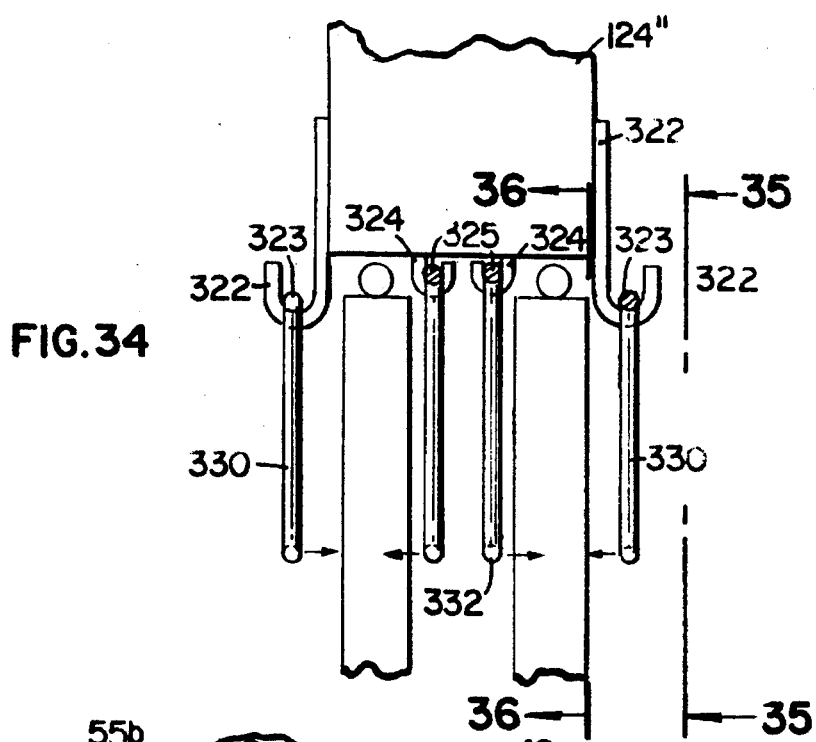
FIG. 34
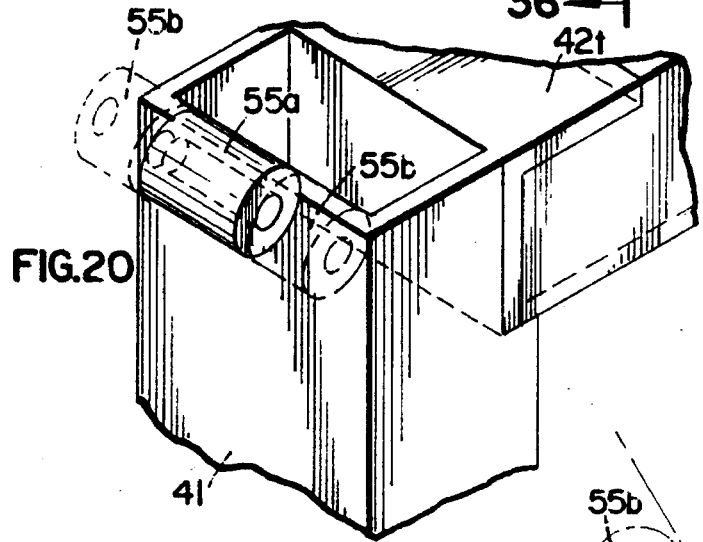
FIG. 20
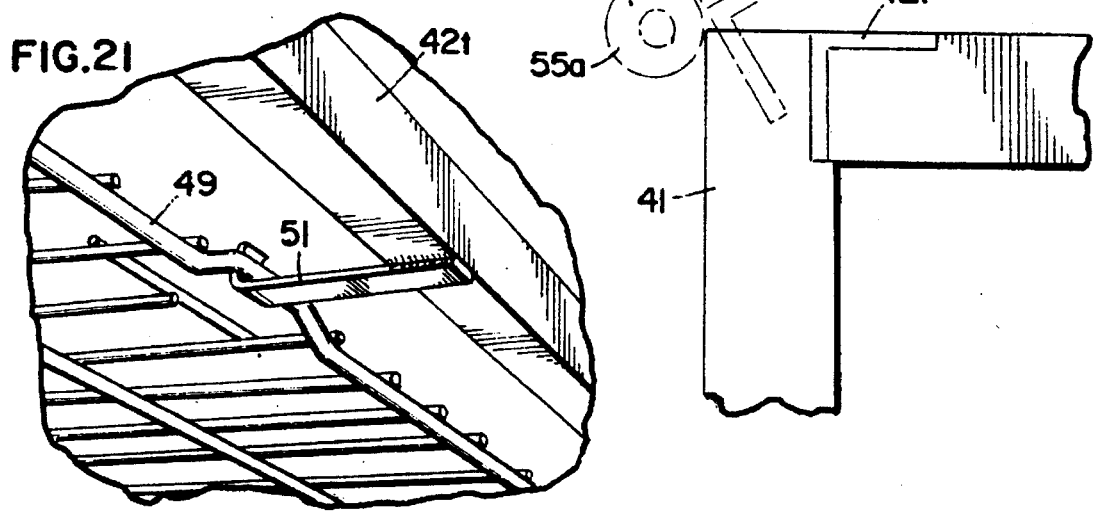
FIG. 21
FIG. 22

FIG.23B

| COLUMN | A | B |
|--------|-----|-----|
| L1 | 215 | 220 |
| L2 | 216 | 221 |
| L3 | 217 | 222 |
| L4 | 218 | 223 |
| L5 | 219 | 224 |

GATE  PLATFORM
211 213  109L

CONVEYOR  (MAIN)
254 258  260

| B | A | COLUMN |
|-----|-----|--------|
| 230 | 225 | R1 |
| 231 | 226 | R2 |
| 232 | 227 | R3 |
| 233 | 228 | R4 |
| 234 | 229 | R5 |

PLATFORM  GATE
109R  210 212

CONVEYOR  BEAM
252 256  207

DIVIDER PLATE
F   R
209 208

160

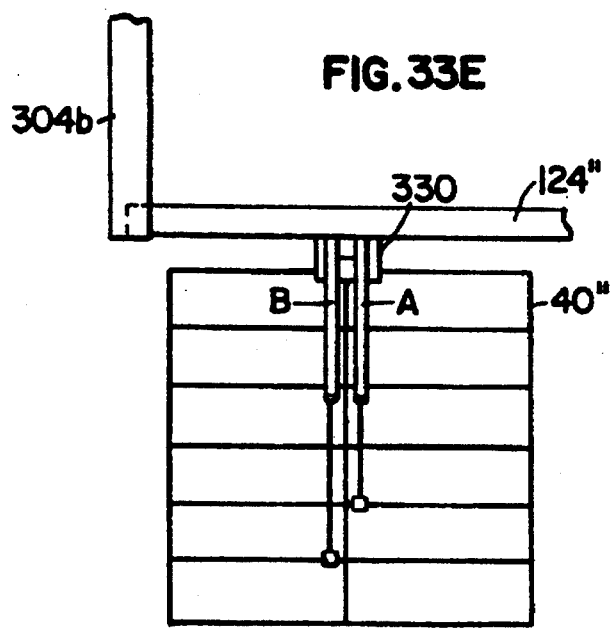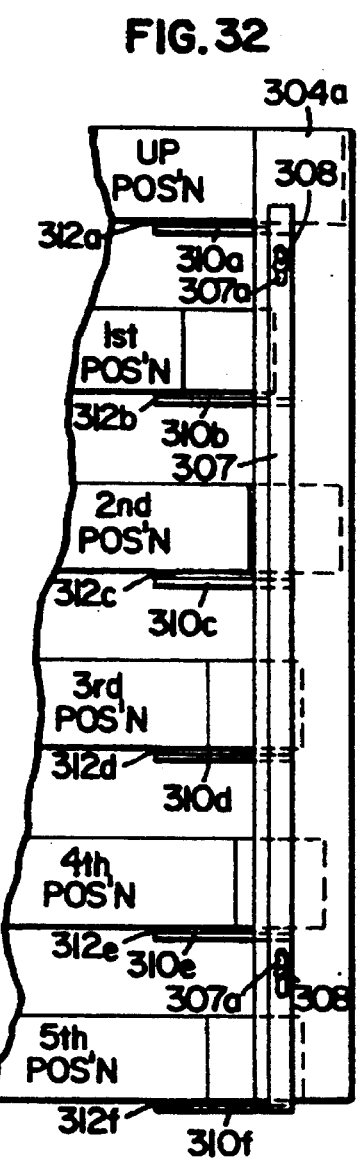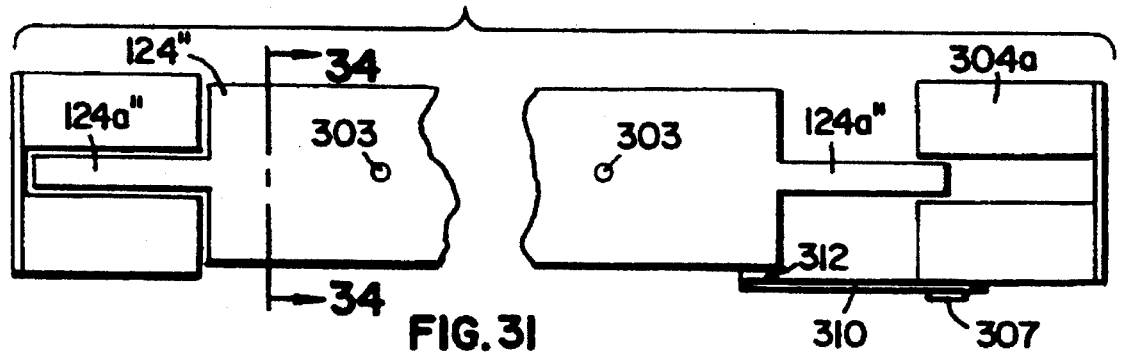

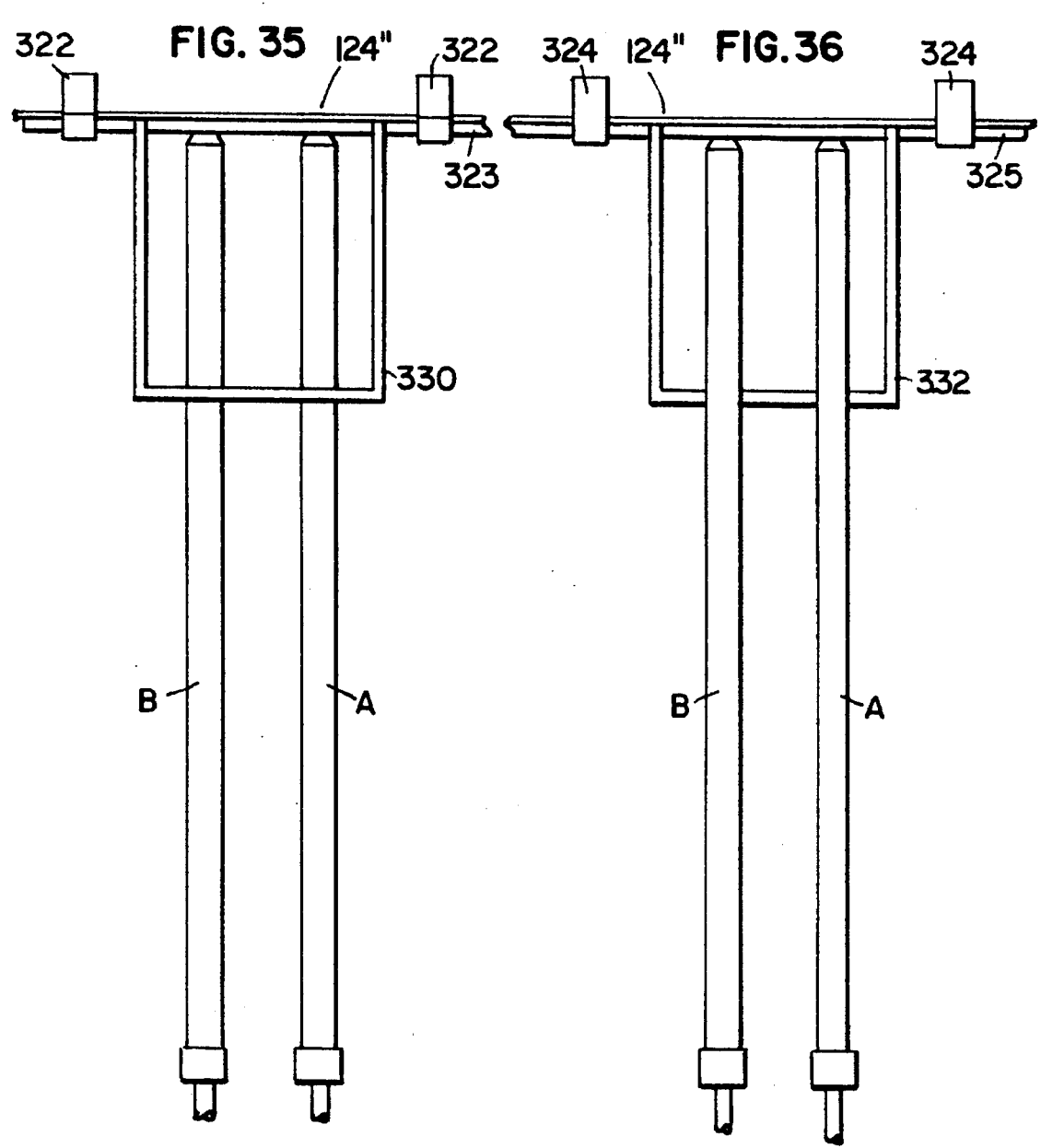
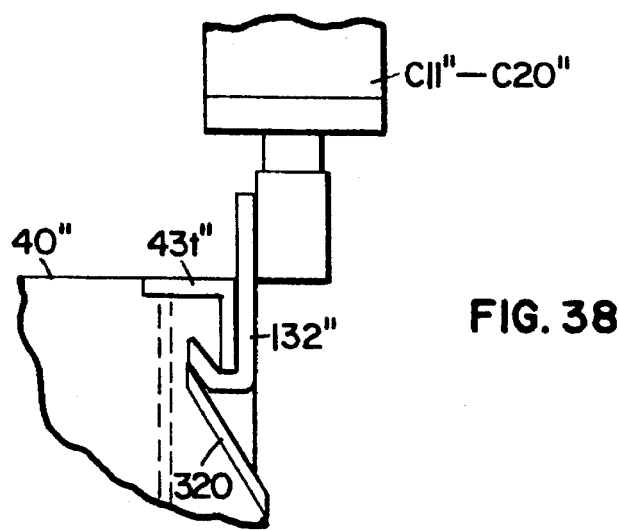
FIG. 38

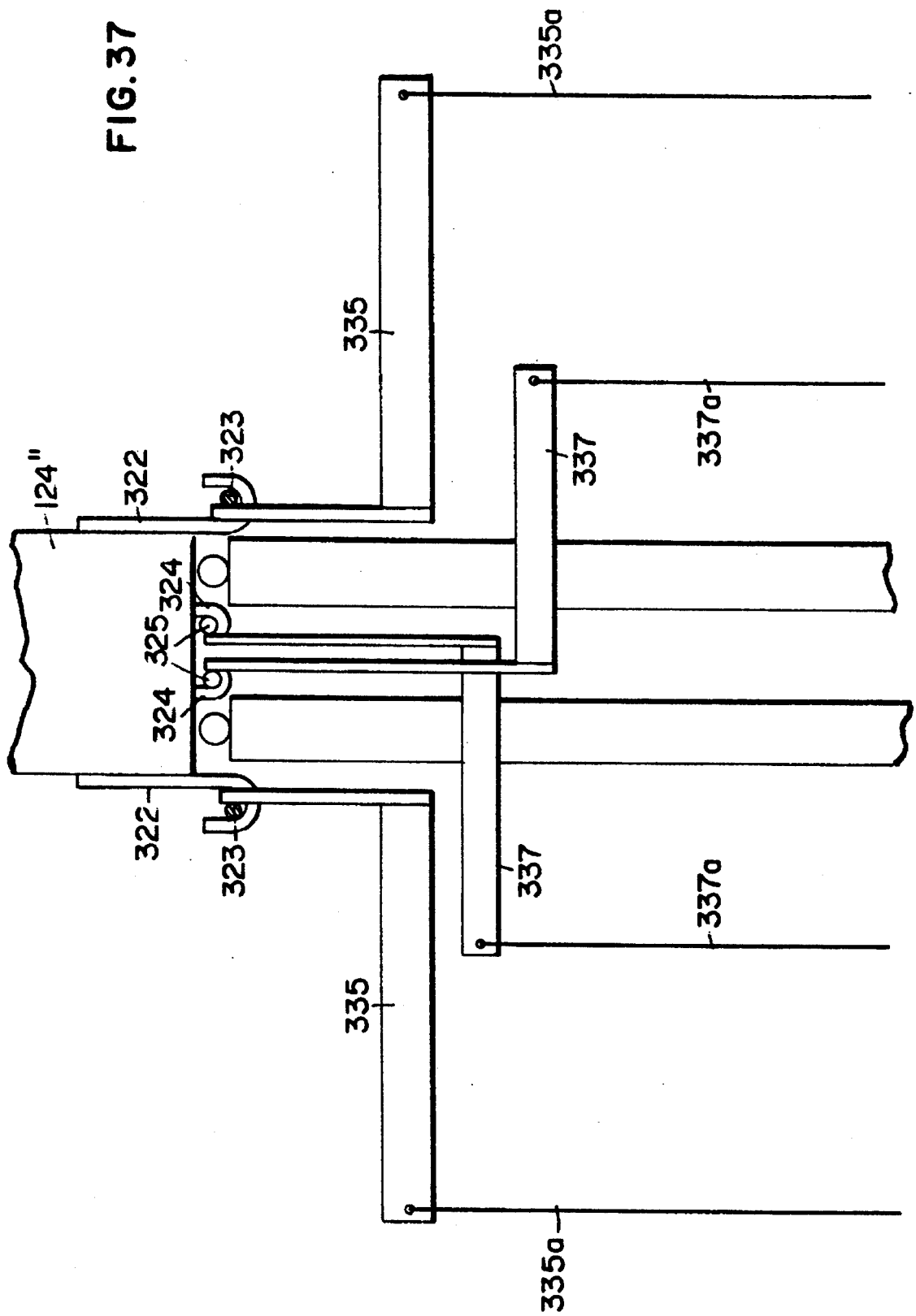

METHOD FOR UNLOADING CONTENT OF MULTILAYER CONTAINERS

This is a division of application Ser. No. 08/033,767, filed Mar. 18, 1993, now U.S. Pat. No. 5,388,948.

FIELD OF THE INVENTION

This invention relates generally to the unloading of contents of multilayer Containers and more particularly to a unique mechanized process and apparatus for systematically unloading live poultry from a plurality of multi-level coops on a transport truck, with minimal damage to the poultry.

BACKGROUND OF THE INVENTION

There are many transport applications wherein transported merchandise is housed in a single or several layers so as to prevent damage thereto, multi layered in cages, coops or containers carried by a large transport vehicle bed, such as a flatbed trailer truck. Unloading of the containers in a systematic manner so as to avoid piling or congestion of the contents in the unloading area, or so as to avoid damage to the contents has long been a problem to the transport industry and to the various unique industries processing the contents. The transport of fruit and vegetables that cannot tolerate direct multi-level packing, and of live animals that must be housed in cages or coops containing only several of such animals, are but several examples of such industries to which the present invention applies.

One unique example, and that to which the preferred embodiment of the invention will be directed, is the and vegetables that cannot tolerate direct multi-level packing, and of live animals that must be housed in cages or coops containing only several of such animals, are but several examples of such industries to which the present invention applies.

One unique example, and that to which the preferred embodiment of the invention will be directed, is the poultry processing industry. The reader will understand that while the invention will hereafter be described with respect to the handling and processing of poultry, the principles of the invention are not to be limited thereby.

Live poultry is generally transported to modern processing plants on large flatbed truck trailers carrying the poultry in multilayer cages or coops. A transport truck typically carries as many as 160 coops for chickens, holding approximately 13,200 chickens, and as many as 120 coops for turkeys, holding approximately 1,440 turkeys. The poultry cages or coops are normally multi-level, usually 6 levels high for turkeys and up to 12 levels high for chickens.

Those used for transporting turkeys are normally mounted on both sides of the truck trailer with their coop doors or gates facing the outside of the trailer. The multi-level cages are generally 8 to 10 feet high, are built in sections of 8 to 16 feet long and are generally about 45" in depth, thus allowing a 6-inch ventilation air space between the coops down the middle of the truck. The doors of Turkey coops generally lift up and slide back into the coop at their tops, in overhead door manner.

In the chicken broiler industry, a wider variety of transport coops are used. The most common multilayer coop is 6 levels high, measuring 8 feet long, 4 feet wide and 52 inches high. The coops are generally divided on each level into three sections. The doors of the chicken coops generally are hinged at the bottom of the coop and pivot outwardly. Some coops do not use doors or gates, but are built in drawer fashion. Since chickens have a flightier temperament than turkeys, loading and handling of chickens is often performed at night; whereas turkeys can be handled at anytime of the day.

Most modern poultry processing facilities use a conveyor system to transport the carcasses of the birds from one work station to the next during the processing operations. Typically, a conveyor system is used in the processing plant which includes an endless conveyor chain mounted on an overhead track assembly. A succession of shackles are attached to and hang downward from the chain, each shackle being adapted to receive and hold the legs of an individual bird in inverted or head-down configuration. The shackled bird typically moves some distance into a slaughter area where it is stunned by an electric shock, or is anesthetized before its neck is cut by a revolving knife. Proper bleeding of the bird is facilitated if its heart is still beating, which generally dictates that the bird not be stunned or anesthetized until just prior to reaching the slaughter area.

Unloading of poultry from their carrying cages or coops of the transport vehicle into the restraining shackles has long been a problem for the processing industry. Such unloading has been very labor intensive, is difficult and often dangerous to the person doing the unloading, is traumatic to the bird being handled, and often results in injury or damage to the bird.

Due to the large size of turkeys, their unloading has generally been done by hand, wherein an unloading person opens one coop at a time and individually removes each turkey from its transport cage and lifts and places the bird into its confining shackles. Since turkeys generally weigh between 25 and 40 pounds, the unloading task is extremely strenuous, time consuming and difficult and the turkeys are generally uncooperative in the process. The process also results in damage to the bird as it moves in inverted position along the shackle conveyor. The bird's struggle to free itself from the shackles can cause severe stress often resulting in body bruising and broken bones and lowering the grade of the meat.

Direct placement of turkeys from the transport container into an inverted leg shackle position gives rise to other potential problems during the processing stage. The birds will generally not defecate while in transport or while in an inverted shackled position. Therefore, when birds are unloaded in the conventional manner, it is common for their large intestines to be full. When a cut is made around the bird's vent area during processing, any cut into the large intestine will enable fecal matter from the large intestine to leak out onto the bird's skin. The contaminated area must be cut away, causing downgrading of the carcass. Such contamination could be significantly reduced, if the birds had a chance to defecate in an upright position after unloading from the coops and before being placed into leg shackles.

Generally, the turkey unloading operation is very labor intensive, requiring a number of workers to perform the unloading process, which is typically simultaneously performed from both sides of the transport truck. The shackle-containing conveyors are generally placed along each side of the truck, and the unloading workers open one cage at a time and individually remove and hang each turkey into its restraining shackles. Typically the unloading personnel stand on platforms on either side of the transport truck. The platforms are raised and lowered to place the unloaders at the most convenient elevation for unloading the turkeys from the various coop levels. While attempts have been made to automate and simplify the shackling process (see, for example, U.S. Pat. No. 5,108,345), the basic manual process of unloading turkeys from the transport coops has not changed.

Methods have been devised to transport poultry, and in particular chickens, to a processing plant in individual support containers or restraints (as, for example, illustrated in U.S. Pat. Nos. 3,260,239 or 3,234,915 or 4,215,654). Such transport apparatus is fairly costly and still requires manual labor to individually secure the chickens within such restraints or containers prior to transport. Accordingly, the vast majority of the industry still transports chickens to the processing plant in cages or coops containing a plurality of chickens that are generally unrestrained for movement within the cages during transport.

While the basic technique of unloading turkeys at the processing plant has not changed much over the years, a number of techniques have been used in the art for unloading chickens from their transport coops. The greater flexibility in handling chickens is due in part to their smaller size and lesser susceptibility to injury as compared to the larger turkeys. One unloading technique has employed permanently mounted multilayer coops on the transport truck, with side opening doors. Chickens are individually unloaded from the coops through the side doors, in the same manner previously described for turkeys, or are pulled out onto conveyor belts that are aligned with the doors, for transport by the conveyors into the processing plant. Once within the processing plant, the chickens are then individually placed into shackles in manner similar to that described for turkey processing operations. Another type of chicken transport coop is configured in the nature of a drawer, which is slid out or opened at the processing plant, and the chickens are individually lifted from the drawer.

Other unloading techniques require removal of one or a stack of coops from the transport vehicle before the chickens are emptied from the coops. In general, such techniques are labor intensive and time consuming and require a forklift vehicle to lift the coop modules from the transport vehicle to the unloading station and back again. One such technique takes the removed module of coops and tips the entire module toward its opened door side, dumping the chickens out of the coops and onto a wide conveyor belt that runs into the processing facility. With this technique, as many as 720 chickens are dumped onto the 4 foot wide conveyor belt at a time. Chickens from the upper coops fall a considerable distance onto the belt and/or onto other chickens, often causing injury or bruising of their meat. A variation of this technique moves the entire multilayered coop module to an unloading station that aligns a plurality of multi-level chutes or slides with each coop level. The entire coop module is then tipped toward the chutes, causing the chickens to be dumped out of their cages and guided by the chutes onto a large collection conveyor. Since multiple levels of chickens are simultaneously deposited on the same delivery conveyor belt, such technique can result in undesirable injury to the chickens due to bumping each other in the congested collection areas and due to the upper layer chickens falling onto chickens already deposited on the belt from lower levels. Yet another chicken unloading system uses a dumping system that simultaneously tips all of the multi-level coops along the length of a flatbed truck trailer, thereby dumping all of the chickens from the containers onto a common collection medium. Damage to the dispensed chickens using this method is high due to contact during falling and congestion.

Accordingly, while many techniques have been used in the art for unloading poultry at a processing plant from transport containers or coops, each suffers one or more drawbacks of: inflicting damage to the birds, being labor intensive, exposing the unloading personnel to danger from the birds and to injury due to excess lifting, and/or complication or cost of implementation. The present invention addresses the above problems and shortcomings of prior art unloading apparatus and techniques, and provides an efficient and cost effective method and apparatus for unloading poultry in a manner that minimizes damage and stress to the birds and which requires little labor and isolates the unloading personnel from undesirable contact with the birds being unloaded.

SUMMARY OF THE INVENTION

This invention provides both an improved method and apparatus for gently and efficiently unloading contents from multilayer container columns into a discharge collector. The invention is particularly suitable for unloading poultry such as turkeys and chickens from multilayer coop assemblies. The invention provides an improved multilayer container construction wherein the stacked containers are secured and hinged to the underlying container of the column along their lower front edges. Such configuration enables the containers to be individually tilted about the hinged connection, in sequential manner from top to bottom, to effectively and efficiently unload the container contents. Rows of such container columns can be unloaded an entire layer at a time, or sequentially by column for any layer. Further, a single operator can simultaneously unload a transport truck of such containers from both sides thereof, in sequential layer by layer fashion.

The invention also includes automated gate opening means for opening the discharge gates of the containers to be emptied, immediately before emptying, and adjustable conveyor means that can be moved to the proper elevation of the container being emptied, to gently receive the discharged contents of the container. The invention also includes an automated lifting assembly, generally located at a processing plant, for sequentially lifting the backs of the containers, to perform the emptying function. The lifting apparatus includes a plurality of cooperatively paired lifting elements, such as hydraulic cylinders, for tilting each of the container columns of a transport load. The lifting means engage hook members on the receptive containers, for lifting the backs of the containers to tilt them about their hinged front edges. A single control panel that can be lowered behind the transport load at the processing facility, enables a single operator to perform the entire unloading operation from a position which provides a clear vision of the unloading process.

According to one aspect of the invention, there is provided a method of unloading a multilayered container of the type having a plurality of similar containers vertically aligned upon one another to form an integral vertical container column, wherein successive ones of the vertically aligned containers are hinged along horizontal axes to one another along one side of the column, defining a discharge side of the column, with the lowermost container being hinged to a support base for the column, comprising: (a) arranging a discharge collector of a type suitable to collect the contents of the containers in general vertical alignment at the discharge side, with the bottom of the uppermost container; (b) opening the discharge side of the uppermost container to expose its contents to the discharge collector; (c) tilting the upper most container about its lower hinged edge at its discharge side to a tilted position, thereby causing the contents thereof to gently move by gravity from the tilted container and into the discharge collector; (d) moving the discharge collector into general vertical alignment at the discharge side with a bottom of the next lower container; (e) opening the discharge side of the next lower container; (f) tilting the next lower container about its lower hinged end at its discharged side to a tilted position, thereby causing the contents thereof to move by gravity from the tilted container and into the discharge collector; and (g) successfully repeating the steps of: moving and aligning the discharge collector, to successively lower containers; opening the discharged sides of those containers with which the discharge collector is aligned; and tilting those containers having opened discharged sides about their lower hinged ends to discharge their contents into the discharge collector, until the contents of the entire container column have been emptied into the discharge collector.

According to yet another aspect of the invention, there is provided a method of unloading a row of multilayered container columns, wherein each container column is of the type having a plurality of similar containers vertically aligned upon one another to form an integral vertical container column, with successive containers being hinged along horizontal axes to one another along a discharge side of the column, with the lowermost container being hinged to a support base for the column, and such that the respective discharge sides of all columns of the row are generally aligned in a common plane, comprising: (a) vertically arranging a discharge collector of a type suitable to collect contents of the containers in general alignment at the discharge side with bottoms of the uppermost containers of the row of container columns; (b) opening the discharge sides of the uppermost containers of the row of container columns to expose their contents to the discharge collector; (c) tilting the uppermost containers of the row of container columns about their respective lower hinged edges at their discharge sides to a tilted position, thereby causing contents of the uppermost containers to move by gravity from the tilted containers and into the discharge collector; (d) vertically aligning the discharge collector at the discharge side with the bottoms of the next lower containers of the row of container columns; (e) opening the discharge sides of the next lower containers; (f) tilting the next lower containers about their respective lower hinged edges at their discharge sides to a tilted position, thereby causing contents thereof to gently move by gravity from the tilted containers and into the discharge collector; and (g) successively repeating the steps of: vertically operatively aligning the discharge collector into alignment with successively lower containers of the row of container columns; opening the discharge sides of those containers aligned with the discharged collector; and tilting those aligned containers with open discharge sides about their lower hinged edges to discharge their contents into the discharge collector, until the contents of the entire row of container columns have been emptied into the discharge collector.

According to yet another aspect of the invention there is provided a multilayer container column comprising: (a) a plurality containers of generally the same configuration, each having a top, a bottom, and side walls extending therebetween for collectively defining an internal cavity for retainably holding a cargo; (b) gate means in the side walls of the containers for enabling access to said internal cavity therethrough; (c) means for vertically aligning said plurality of containers one upon the other in aligned configuration such that their gate means generally lie in the same plane at a discharge side of the stacked containers; and (d) hinge means for pivotally interconnecting the aligned containers about their horizontal edges at the discharge side thereof, wherein said containers can be selectively tilted about the hinge means to unload cargo from their internal cavities through the gate means.

According to yet a further aspect of the invention, there is provided gate opening apparatus for automatically opening discharge gates of a multilayer column of stacked containers, comprising: (a) a base; (b) engagement means for removably engaging a discharge gate of a container of a multilayer column of stacked containers; (c) first movement means mounted to the base and operatively connected with the engagement means for moving the engagement means in a generally vertical direction; (d) second movement means mounted to the base and operatively connected with the engagement means for moving the engagement means in a generally horizontal direction, orthongal to the vertical direction; (e) operator control means operatively connected with the first and second movement means for selectively moving said engagement means in a manner so as to engage and open the discharge gate; and (f) means operatively connected with the base for raising and lowering the base; wherein the base movement means is operably to position the base such that the engagement means operatively addresses the discharge gate of one of the containers of the multilayer column at a time, and wherein the first and second movement means are operably to engage and maneuver the discharge gate of the addressed container into an open position.

According to yet a further aspect of the invention, there is provided a transport assembly comprising: a plurality of like-sized multilayer container columns, arranged side-by-side to form a row of such container columns, wherein one side of the row of container columns defines a discharge side of the row, each container column being characterized by: (a) a plurality of containers of generally the same configuration, each having a top, a bottom and side walls extending therebetween for collectively defining an internal cavity for retainably holding a cargo; (b) gate means and the side walls of the containers for enabling access to the internal cavity therethrough; (c) means for vertically aligning the plurality of containers one upon the other in stacked configuration such that the gate means of the containers generally lie in a common plane at the discharge side; (d) hinge means for pivotally interconnecting the aligned containers about their respective lower edges at the discharge side thereof; and (e) lower hinge means for pivotally connecting the lowermost container of the container columns at its lower edge at the discharge side to a support base for the transport assembly; wherein the containers can be selectively tilted about the hinge means and the lower hinge means to unload cargo from their respective internal cavities through the gate means.

According to yet a further aspect of the invention, there is a provided a container unloading apparatus for automatically unloading contents from a container load characterized by first and second rows of multilayer container columns arranged in back-to-back parallel spaced relationship on a transport vehicle bed such that discharge gates of the container columns are aligned along oppositively disposed outer longitudinal sides of the transport vehicle bed, with the container columns each comprising a plurality of stacked containers hingedly interconnected about their lower front edges to the container below, with the lowermost container of each column being hingedly connected to the transport vehicle bed, and with each container lift arm means connected to the container for lifting the back of the container for pivotal tilting motion about its hinged front edge, the unloading apparatus comprising: (a) overhead support means configured for overhead alignment with the center of the transport vehicle bed; (b) a plurality of lifting means mounted to the overhead support means and disposed therealong such that one of each of the lifting means is vertically operatively aligned with the lift arm means of each container column, for selectively engaging and raising the lift arm means of containers of their respectively associated container column, to selectively tilt the containers about their hinged edges.

These and other features of the invention will become obvious to those skilled in the art in view of a more detailed description thereof.

BRIEF DESCRIPTION OF THE DRAWING

Referring to the Drawing, wherein like numerals represent like parts throughout the several views:

FIG. 6B is a diagrammatic end view of one-half of the multilayer transport coops of FIG. 6A, illustrating the uppermost two of the left column of transport coops operatively lifted in unloading position;

FIG. 6C is a diagrammatic end view of one-half of the multilayer transport coops of FIG. 6A, illustrating the uppermost five of the left column of transport coops operatively lifted in unloading position;

FIG. 7 is an enlarged end view as generally viewed from Line 7—7 of FIG. 3, and generally from V1 of FIG. 1 illustrating the tops of both rows of multilayer coops carried by the transport truck as positionally aligned under the hydraulic coop lifting assembly of the processing plant, positioned in a first, raised position;

FIG. 11A is a diagrammatic end view of the multilayer dual transport coops of FIG. 1 as they would appear generally from the Line 11—11 of FIG. 2, when positioned within the unloading station of the processing plant, illustrating positional alignment of the coops relative to a coop gate opening and belt conveyor assembly of the processing plant, when such assembly is aligned to initiate opening of the upper coop gate;

FIG. 12 is a partial top view of the hydraulic coop gate opening apparatus of FIG. 11, illustrating the plurality of coop gate opening arms as operatively aligned with the coop gates for the left row of coops;

FIG. 13 is a frontal elevational view, with portions thereof broken away and generally viewed along the Line 3—3 of FIG. 1, illustrating a portion of the coop locking assembly of the transport system of FIG. 1 for one column of multilayer coops;

FIG. 14 is a top elevational view of the coop locking assembly of FIG. 13;

FIG. 15 is an enlarged top elevational view with portions thereof broken away of one of the multilayer dual coops of FIG. 1;

FIG. 16 is a front elevational view of the dual coop of FIG. 15;

FIG. 17 is an end elevational view with portions thereof broken away of the dual coop of FIG. 15;

FIG. 18 is an enlarged detailed view of FIG. 17, as generally viewed from V2 in FIG. 17, showing the interlocking arrangement of nested dual coops along their back edges;

FIG. 19 is an enlarged detailed view generally taken at V3 of FIG. 17 illustrating one of the three alignment pins engaging two multilayer dual coops along their back edges;

FIG. 20 is an enlarged perspective view of one of the three hinges securing two multilayer dual coops along their front edges as generally indicated at V4 in FIG. 15;

FIG. 21 is an enlarged perspective fractional view of the gate latch apparatus of FIG. 17 illustrated with a gate in a latched position;

FIG. 22 is an enlarged detail side view of FIG. 17, showing the pivoting relationship at the front edge of two connected coops;

FIG. 23B is an enlarged view of the controls for the left operation panel of FIG. 23A;

FIG. 23C is an enlarged view of the controls for the right operation panel of FIG. 23A;

FIG. 31 is a fractional top view of the overhead lifting beam of FIG. 30, illustrating its end guide assembly;

FIG. 32 is an enlarged frontal view of the right guide assembly for the overhead beam, illustrated in FIG. 30, depicting the support beam in six different vertical and several different longitudinal positions relative thereto;

FIG. 33E is a diagrammatic view illustrating the overhead beam of FIG. 30 in a fifth position, with its associated lifting cylinders positioned for lifting the fifth and lowermost layers of coops;

FIG. 34 is an enlarged cross-sectional view generally taken along the Line 34—34 of FIG. 31, illustrating the inner and outer cylinder engaging lever arms;

FIG. 35 is a view generally taken along the Line 35—35 of FIG. 34, illustrating the outer cylinder engagement lever arm;

FIG. 36 is a side view generally taken along the Line 36—36 of FIG. 34, illustrating the inner cylinder engaging lever arm;

FIG. 37 is an enlarged cross-sectional view generally taken along the Line 37—37 of FIG. 30, illustrating the activator means for the inner and outer cylinder engaging lever arms of FIGS. 35 and 36;

FIG. 38 is an enlarged view of the hook arm of a lifting cylinder, illustrated as engaged to the receptor hook portion of a coop configured according to the third embodiment of the invention.

DETAILED DESCRIPTION OF THE INVENTION

Figure 1:
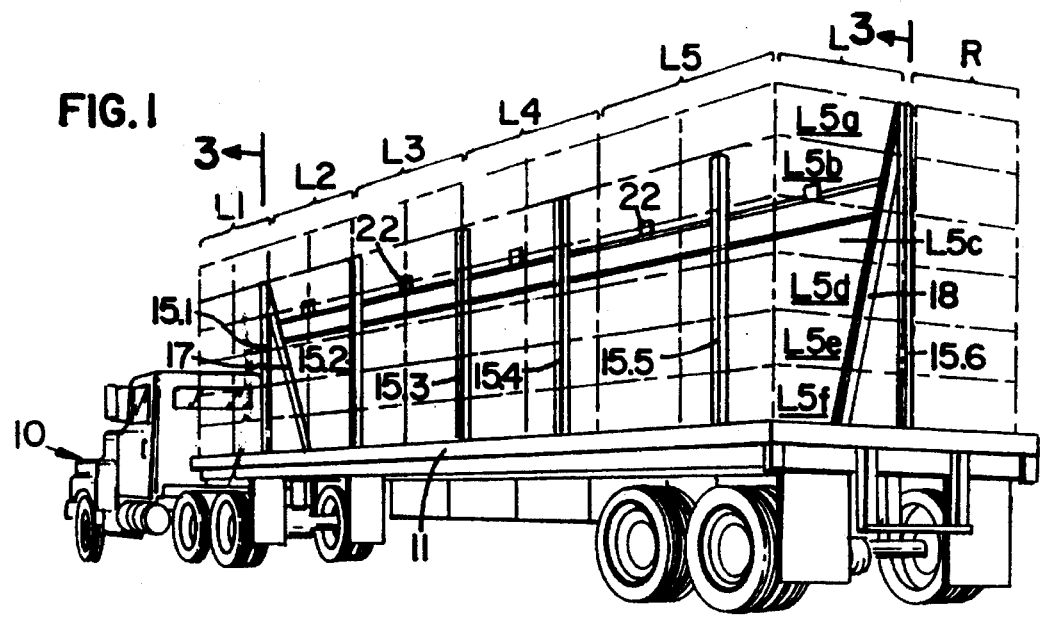
FIG. 1 is a perspective view of a truck for transporting poultry, illustrating a plurality of multilayer dual poultry coops arranged and configured thereon according to the general principles of this invention.

While the present invention applies to the unloading of any type of material or animal suitable for transport within a plurality of vertically multilayer containers, cages or coops, the invention will be described with respect to its preferred embodiment application of sequentially and systematically unloading turkeys from a plurality of multilayer columns of transport coops. Referring to FIG. 1, a flatbed transport truck of the type often used to transport turkeys to a processing plant, is generally illustrated at 10. The trailer bed or deck 11 of the truck 10 carries a plurality of multilayer turkey cages or coops, generally illustrated at 40 that are arranged in two rows (L) and (R) extending in parallel fashion from the front to the rear of the trailer bed 11 respectively along the "left" and "right" sides of the trailer bed. In the preferred embodiment, each of the two rows of coops is divided into a plurality of multilayered and aligned vertical columns of coops, indicated as "L1" through "L5" for the left (L) row of coops, and "R1" through "R5" for the right (R) row of coops respectively. The R1–R5 columns of coops are not indicated in FIG. 1, but are understood to lie directly opposite of their corresponding L1–L5 columns of coops indicated for the left (L) row of coops. In the preferred embodiment, each of the columns (L1–L5) and (R1–R5) of multilayer coops comprises six dual coops vertically aligned and stacked upon one another. It will be understood, however, that the principles of this invention would apply to multilayer coops or containers having any number of containers. The coop structure will be described in more detail hereinafter.

For simplicity and consistency in later describing the various levels of coops within any particular column thereof, the coop levels will be consecutively labeled from "a" through "f" starting from top to bottom. For example, in the L5 column of coops, individual coop designations from top to bottom of the multilayer coops would be designated: L5a, L5b, L5c, L5d, L5e and L5f—as indicated in FIG. 1. In the preferred embodiment, each side of a dual coop is approximately 4 feet wide, 44 inches deep and 16 inches high, making the overall width dimension of a dual coop 8 feet. Since there are five stacked columns of dual coops illustrated in each row of the trailer bed 11 in FIG. 1, the overall dimension of the trailer bed of that transport vehicle indicated in FIG. 1 is approximately 40 feet long and 8 feet wide. It will be understood that various sizes and configurations of such transport vehicles can be configured, depending upon how many coops one desires to secure to the vehicle.

The plurality of multilayer coops of the left (L) and right (R) rows of coops are backed into parallel proximity with but slightly spaced from a central support structure 15 securely mounted to the support trailer bed 11. In the preferred embodiment, there is approximately 6 inches separation between the backs of the coops of the left (L) and right (R) rows. The central support structure 15 secures the columns of coops to the trailer bed 11 during transport, as hereinafter described in more detail. In the preferred embodiment, the central support assembly is longitudinally aligned with and secured to the trailer bed 11 along its centerline. The central support assembly includes four intermediate upright post members spaced at eight foot intervals to identically align with the junctions between successive columns of dual coops within a row, and a pair of end upright posts mounted at the front and the rear of the truck bed 11 and aligned with the foremost and rearmost edges of the plurality of coops carried by the truck bed. In FIG. 1, the foremost support post is designated at 15.1. The four intermediate support posts are designated at 15.2–15.5 respectively, and the rearmost support post is designated at 15.6. In the preferred embodiment, the support posts 15.1–15.6 are configured of rectangular two inch steel tubing, secured to the trailer bed 11 by means of mounting brackets (not shown) and extending upwardly from the trailer bed 11 to a vertical position generally in the plane defined by the collective tops of the uppermost coops carried by the truck. The top portions of the upright support posts 15.1–15.6 form coop lock assemblies, as hereinafter described in more detail. The upright support posts 15.1–15.6 are interconnected by means of a longitudinally extending bar 16 welded between successive ones of the upright post members 15.1–15.6, to form a solid unitary support structure running along the centerline of the truck bed. Front and rear brace members 17 and 18 respectively, downwardly extend at inclined angles from the front and rear support posts 15.1 and 15.6 respectively and are anchored at their lower ends to the truck bed support surface 11, for adding additional rigidity to the central support assembly.

The foremost upright support member 15.1 may be further supported by a plurality of cross-brace members laterally extending across the truck bed support surface 11 to forwardly disposed posts at the front corners of the truck bed, to provide a full width stop surface for preventing the coop load from shifting toward the cab of the transport truck 10. Such cross-bracing and forward corner stop posts are not illustrated in the figures. In the preferred embodiment, the longitudinal support rod 16 comprises a one-half inch steel pipe member welded between adjacent ones of the upright support members 15.1–15.6.

The longitudinally extending support rod 16 carries a plurality of inverted V-shaped divider plate members 22, disposed along the length of the support bar 16 so as to identically coincide with the centerlines of each dual coop. In the preferred embodiment, there are five such inverted V-shaped divider plates 22, one for each dual stacked column of coops, illustrated in more detail in FIGS. 4–9. Each divider plate 22 is centrally spaced between respective ones of the upright post members 15.1–15.6. The opposing faces of the divider plates 22 symmetrically lie along the vertical plane defined by the central support assembly posts, each defining an upper edge that lies just below the general plane of the tops of the uppermost coops (see FIG. 7). As hereinafter described in more detail, the laterally opposed inclined planar surfaces of the divider plates 22 form slidable guide surfaces for a plurality of lift hooks, and provide a separation barrier for coop lift rod arms of left (L) row and right (R) row columns of coops. In the preferred embodiment, the divider plates are approximately 8 inches wide and approximately 8 inches in height.

Each inverted V-shaped divider plate 22 is flanked at either end by a pair of hook rod release spreader arms 24L and 24R respectively. Those hook rod release spreader arms designated by 24L correspond to arms positioned on the left (L) side of the coop load; whereas those hook rod release spreader arms designated by 24R correspond to those arms disposed on the right (R) side of the coop load. The hook rod release spreader arms 24L positioned on the left (L) side of the divider plate 22 are operatively pivotally mounted for rotation by a first release arm activator rod 25L. The hook rod release spreader arms 24R positioned on the right (R) of the divider plate 22 are operatively pivotally mounted for rotation by a second release arm actuator rod 25R. The first and second release arm actuator rods 25L and 25R are respectively rotatably mounted to the opposite laterally disposed surfaces of the upright support posts 15.1–15.6 and respectively terminate at operator lever arms 26L and 26R (see FIG. 3 and 13) extending from the rear of the coop load. Referring to FIG. 7, as the operator lever arm 26L (not illustrated) is rotated in a counterclockwise direction, the first release arm actuator rod 25L is caused to rotate about its axis in a counterclockwise direction, causing the plurality of hook rod release spreader arms 24L to also rotate in a counterclockwise direction about the axis of the actuator rod 25L. A similar (but in the opposite direction) occurrence takes place with respect to the hook rod release spreader arms 24R when the operator lever arm 26R is rotated in a clockwise direction. Each of the hook rod release spreader arms is slightly tapered from top to bottom (i.e., that position approximately at the height of the longitudinal support bar 16). In the preferred embodiment, the taper is from 1 inch wide at the top to 1⅛ inch wide at its lower portion. The purpose for operation of the hook rod release spreader arms 24 will be described in more detail hereinafter.

Each of the upright support members 15.1–15.6 is capped by a coop lock mechanism, generally illustrated at 30 in FIGS. 13 and 14. The coop lock mechanisms 30 are operative, as discussed in more detail hereinafter, to engage the uppermost coops of a multilayer column L1-L5 or R1-R5 of coops, at the rearward corners of such coops for exerting downward pressure on such engaged corners so as to secure the rearward portions of the coop columns to the truck trailer bed 11. A rotatable lock shaft 31 horizontally extends down the length of the central support assembly 15 and just below the longitudinal support bar 16, for operating the coop lock mechanisms 30. The rotatable lock shaft 31 rotatably passes through each of the coop lock mechanisms 30 (as illustrated in FIG. 13). The rotatable lock shaft 31 terminates at the rearward end of the coop load, beyond the rearmost upright support post 15.6 at a crank handle 32. In the preferred embodiment, the rotatable lock shaft 31 is secured within each coop lock mechanism 30 to a small pinion gear 30a which meshes with a larger bevel gear 30b that rotates a vertical shaft 30c—all supported within the lock mechanism by a pair of bearings 30d. The upper length of the vertical shaft 30c is threaded into a mating nut forming a part of a cross arm member 33. The cross arm member 33 is raised and lowered by counterclockwise and clockwise rotation respectively of the shaft 30c when viewed from above. The cross arm member 33 includes four downwardly extending spaced post protrusions 33a and 33b. Those post extensions indicated at 33a are configured (in FIG. 14) for engaging the coop members on the left (L) side of the coop load; whereas those post extensions designated at 33b are configured to engage coops on the right (R) side of the coop load. Each coop lock mechanism 30 includes a stop member 34 projection mounted to the housing of the coop lock mechanism for limiting the pivotal rotation of the cross arm member 33 between two orthogonal positions illustrated in FIGS. 13 and 14, (one aligned to engage the adjacent coop members as shown on the rights side of the figures, and the other aligned to freely clear the adjacent coop members so as to allow free movement thereof as shown on the left side of the figures—as discussed in more detail hereinafter).

A more detailed description of the dual coop construction follows with reference to FIGS. 15–22. As described above, each coop 40 of the preferred embodiment is a "dual" coop divided at its center by a dividing wall so as to form two coops each having central cavities of approximately 16 square feet and 16 inches in height. Each coop includes six upright support standards 41 located at each of the four corners and at the front and back center positions of the dual coop. The six upright support standards are interconnected by means of a plurality of angle iron cross-bracing members, to provide the rectangular framework structure for the dual coop. The upper and lower cross-brace members at the front of the coop are indicated at 42t and 42b respectively. The upper and lower cross-brace members at the rear of the coop are indicated at 43t and 43b respectively. The three upper cross-brace members running from front to back of the coop are generally indicated at 44, and the three lower cross brace members running from front to back are generally indicated at 45. In addition to the previously described angle iron cross-brace members, a plurality of floor support braces 46 extend between the front bottom brace 42b and the back bottom brace 43b, and a supplemental roof cross-brace support 47 longitudinally extends between and is secured to the three upper support braces 44.

The vertically extending portion of the upper support brace 43t extends in a vertical plane slightly forward of the vertically extending portion of the lower support brace 43b such that when two coops are operatively vertically aligned, the vertical extension portions of the upper and lower braces 43t and 43b respectively cooperatively mate (as illustrated in enlarged detail in FIG. 18) to lock the coops together from shifting in the forward direction.

A wire mesh is welded to the inside of the formed frame structure on the ends, the back, the top and the center divider, to define two internal compartments or chambers for the dual coop structure that are open at their respective "front" sides. A sheet metal flooring material 48 is secured to the inside of the lower brace members 42b, 43b and to the braces 45 and 46. The wire mesh forming the back of the coop compartments generally does not extend all the way down to the floor 48 but is raised slightly up therefrom, to provide for washing and cleaning of debris and waste from the floor of the coop.

The fronts of the dual coops are closed by means of a pair of gate members 49, each having a gate grid portion 50 laterally extending between vertically oriented angle iron supports 51a and 51b. A dual loop retainer member 52 is welded to each of the vertical supports 51a and 51b at their respective outer edges, for defining a female portion of a guide mechanism for raising the gates 49. The outer ends of each loop retainer member 52 are bent slightly forward and are configured to cooperatively receive an arcuately shaped male guide rod 53 which is secured at its lower end to one of the lower bottom braces 45, and at its upper end to the roof support brace 47. The loop retainer members 52 and the male guide rods 53 cooperatively guide the front gate members 49 upward and back into their respective coop cavities in the manner of opening an overhead door, such that when raised a front gate 49 rests generally parallel to and against the top of the coop.

The grid portion 50 of each front gate 49 includes a pair of openings 50a and 50b oppositely disposed at the lower outer left and right edges respectively of the gate. The openings 50a and 50b are sized to cooperatively accept an automated gate opening operator member, as hereinafter described in more detail. The gates can be held in an open lifted position by means of a gate latch member 54. The male gate latch member 54 is illustrated in FIG. 21 as connected to the upper front cross-brace member 42t and extending rearwardly therefrom to cooperatively engage and hold the gate 49 by means of its mesh material 50 in an open position.

The coops are hinged together in a multilayer column by means of cooperating hinge members 55 secured to the front upright support standards 41 at their upper and lower ends. Male portions of the cooperative hinge tubes are secured to the upper ends of the upright support standards, as indicated at 55a, and the dual female portions 55b of the hinge assembly are secured to the lower ends of the upright support standards 41. When two dual coops are vertically aligned, the female hinge portions 55b of the upper coop identically cooperatively mate with the male hinge portions 55a of the lower coop, providing pivotal motion of the upper coop about the pivot axis longitudinally extending through the mated hinges at the front of the coop. When a column of coops are mounted to the trailer bed of the transport truck, the female hinge portions 50b of the lowermost coop of the column cooperatively mate with a male hinge portion (not illustrated) that is directly mounted to the bed of the truck such that the lowermost coop is directly pivotally mounted to the truck bed along the lower front edge of the coop. A detail of a hinge assembly is illustrated in FIG. 20.

Referring to FIG. 19, the three rearward upright support standards 41 of each dual coop include upwardly projecting alignment pins 57 on all but the uppermost coop of a column of multilayer coops. The alignment pins 57 are configured to matingly slide into the open receptor bottom end of the cooperatively aligned upright support standard 41 of the overlying coop so as to maintain the multilayer coops in vertical alignment relative to one another. Each dual coop may also include a vibrator element 59 to vibrate the floor 48 of the coop to facilitate unloading of turkeys from the coop when in a tilted position.

Figure 3:
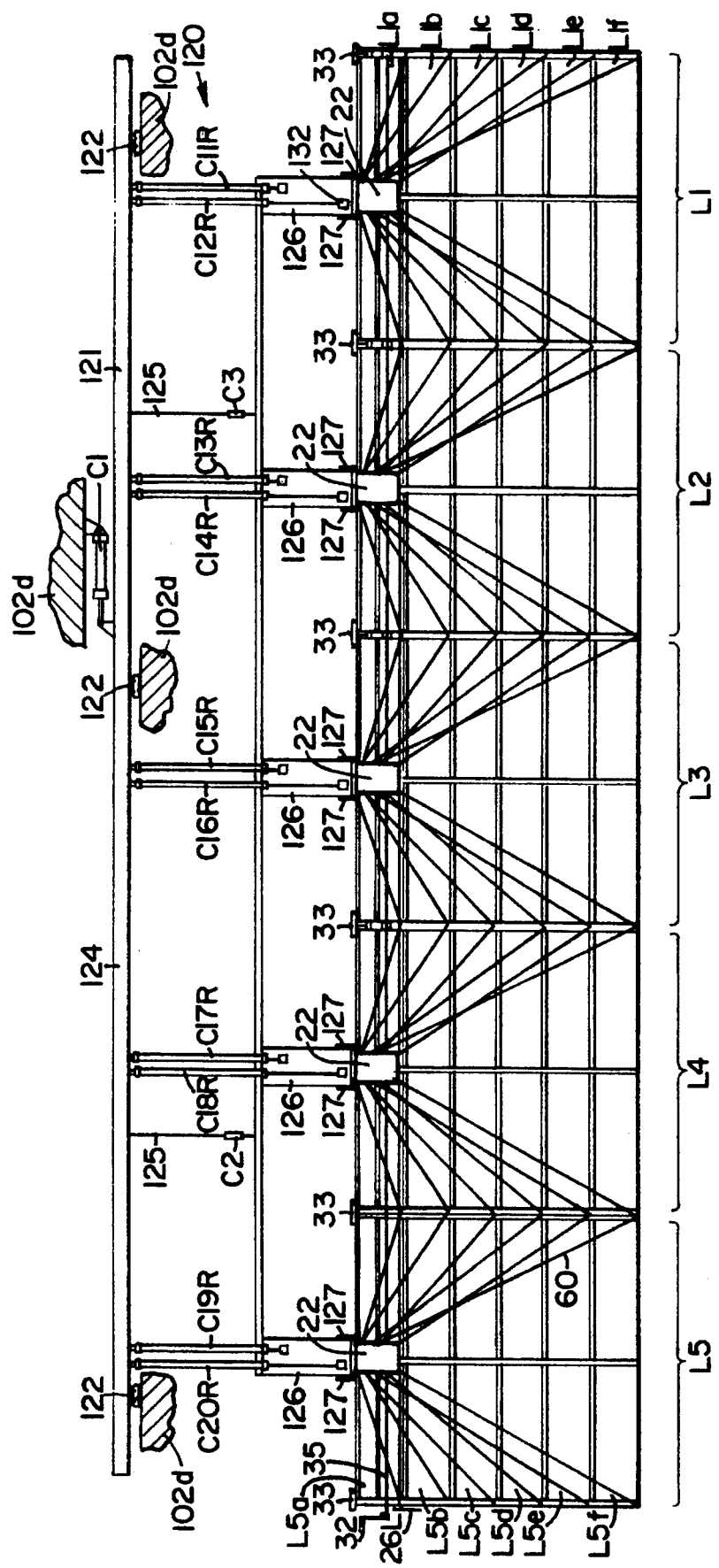
FIG. 3 is a view of the left row of coop columns of the transport truck of FIG. 1, as generally viewed along the Line 3—3 of FIG. 1, illustrating the connection patterns for the coops lifting rod members, and illustrating the coops as operatively positioned under a hydraulic coop lifting assembly forming part of the processing plant of FIG. 2.
Figure 4:
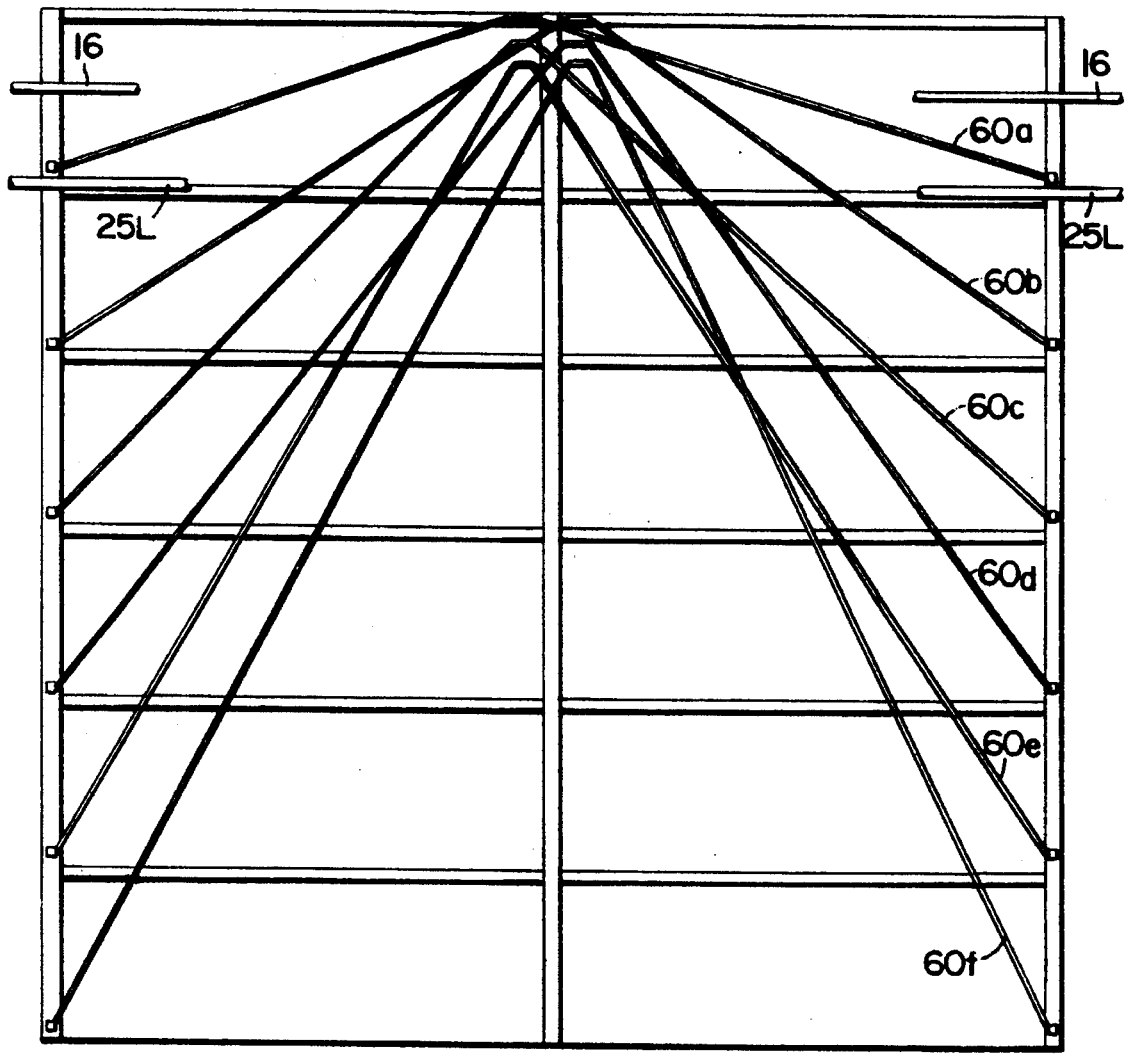
FIG. 4 is an enlarged diagrammatic view of one of the columns of multilayer coops of FIG. 3, illustrating in more detail the lifting rod member configuration for the column of coops.
Figure 5:
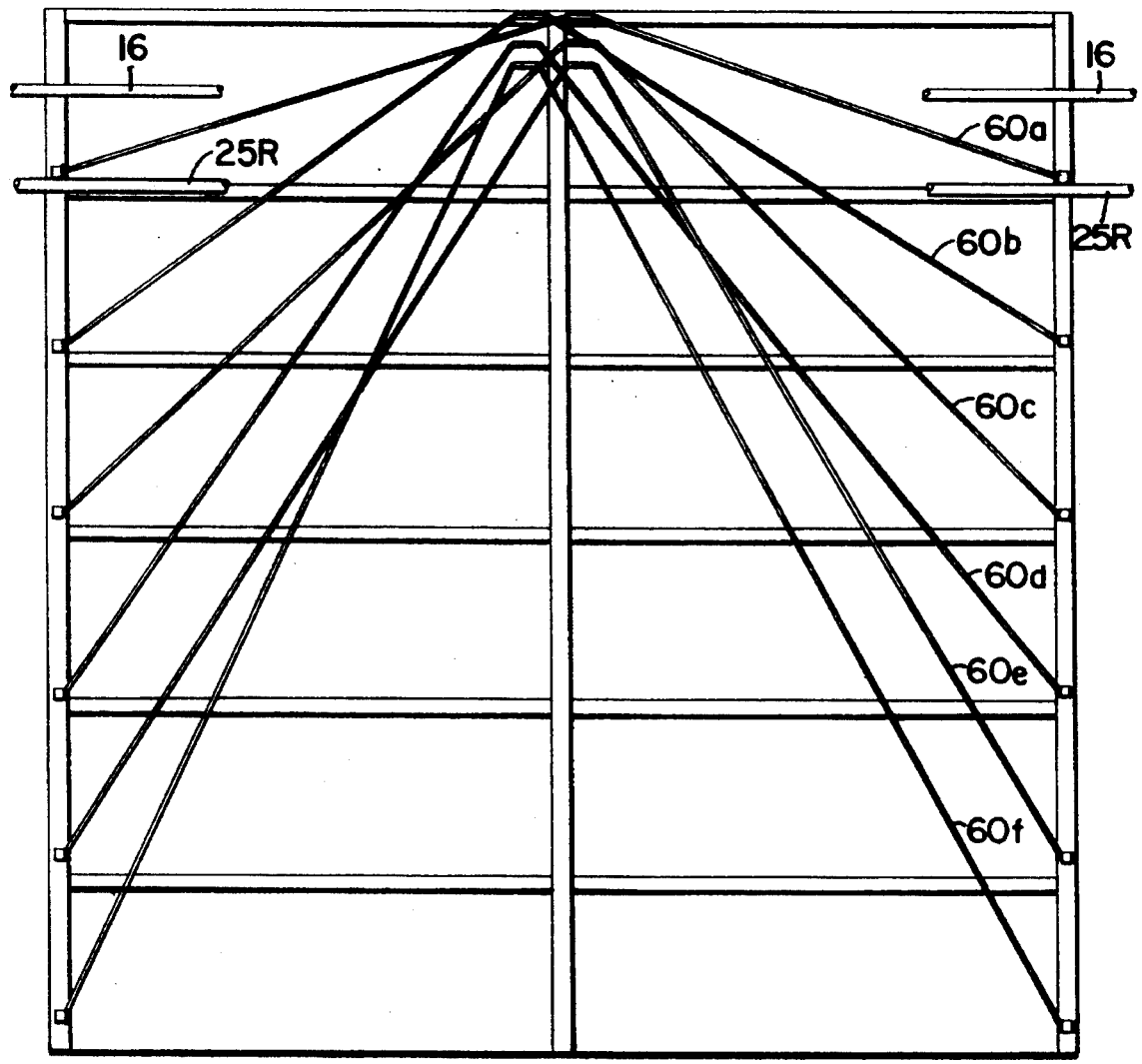
FIG. 5 is an enlarged diagrammatic view, similar to that of FIG. 4, for one of the columns of multilayer coops of the right side of transport load of FIG. 1, as viewed from the center of the truck load and toward the back of the coop column.
Figure 6A:
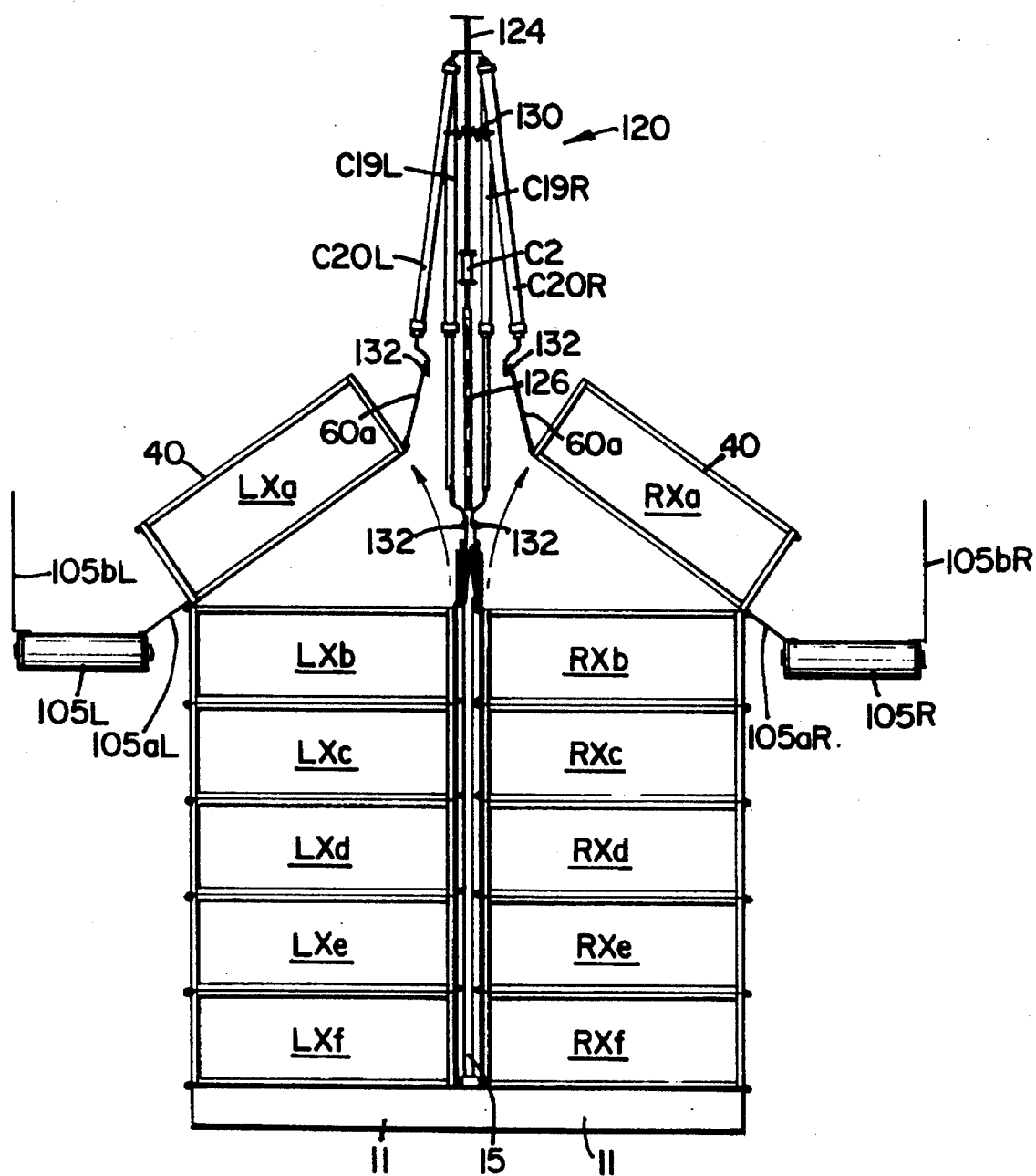
FIG. 6A is a diagrammatic end view of the multilayer dual transport coops of FIG. 1, illustrating their cooperative alignment with the hydraulic coop lifting assembly of FIG. 3, and illustrating the top ones of two columns of such transport coops operatively lifted in unloading position.
Figure 9:
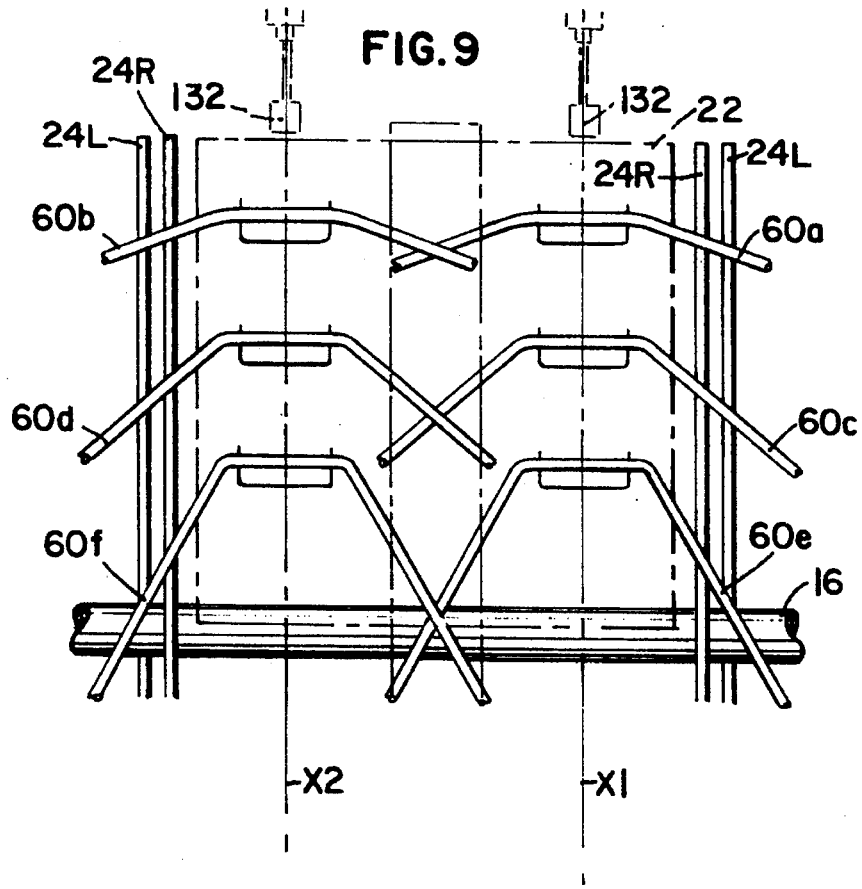
FIG. 9 is an enlarged view of the upper portions of the lifting rods for the coops positioned on the right side of the transport vehicle of FIG. 1, as viewed generally along the Line 9—9 of FIG. 8.
Figure 10:
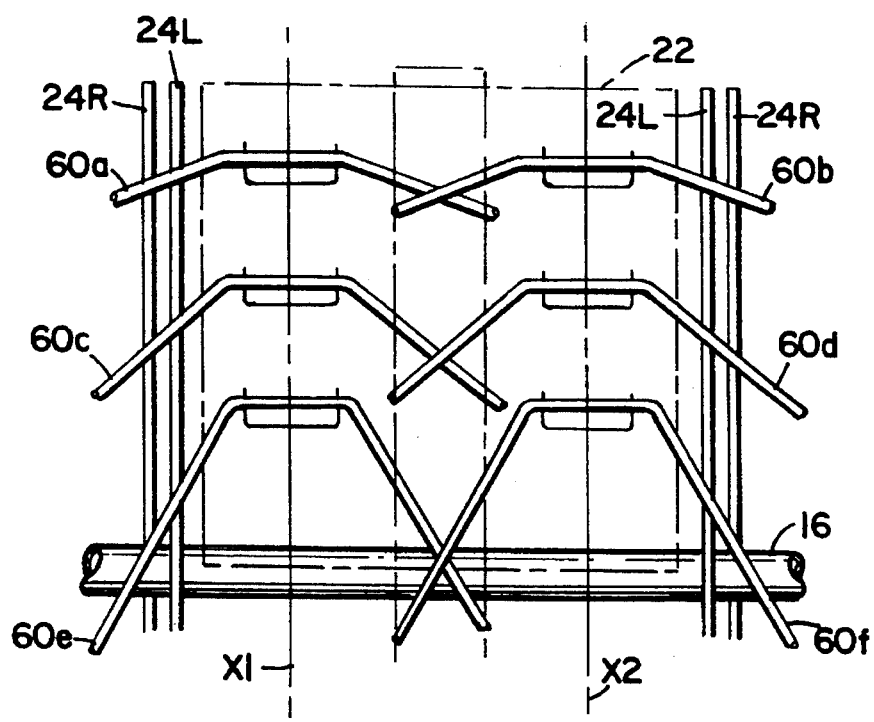
FIG. 10 is an enlarged view of the upper portions of the lifting rods for the coops positioned on the left side of the transport vehicle of FIG. 1, as viewed generally along the Line 10—10 of FIG. 8.

Each dual coop 40 is pivotally moved about its lower front edge pivot axis by means of a lift rod member 60 configured, in the shape of a loop that is rotatably secured to each dual coop at the lower portion of its outermost rear upright support standards 41 (see FIGS. 17 and 18). Each lift rod member 60 is, in the preferred embodiment, made of 3/16 inch spring steel material and extends upwardly from its point of attachment to the coop and toward that inverted divider plate 22 which is associated with the multilayer dual coop column of which the coop is a part. The respective lengths of the lift rod members 60 for coops within a particular column vary according to the vertical position of the coop within its column. Referring to FIGS. 3–5, it will be noted that the length of the lift rod 60f for the lowermost coop is the longest; whereas the lift rod 60a for the uppermost coop, is the shortest. In the preferred embodiment, all of the lift rod members 60a–60f for a column of dual coops terminate at their upper ends within four inches of one another and address the inverted divider plate 22 associated with that coop column. Enlarged views of the upper, loop ends of the lift rod members 60 for the six layered coop column structure of the preferred embodiment for coop columns on the left and right rows respectively are illustrated in FIGS. 9 and 10. Referring thereto, it will be noted that every other one of the lift rod members is horizontally staggered with respect to the next successive lift rod member, and that the lift rod members alternatively align along two spaced vertical axes (X1) and (X2). The lift rod members $60a$–$60f$ consecutively overlie one another from top to bottom, such that lift rod $60f$ lies closest to the back of the multilayer column of coops, and lift rod $60a$ lies furthest from the back of the column of coops. In the preferred embodiment, the vertical spacing between successive top portions of the lift rods 60 along the X1 and X2 axes is only two inches, such that, the total vertical distance between the uppermost portions of lift rods $60b$ and $60f$ or $60a$ and $60e$, is only four inches. Further, in the preferred embodiment, the lifting axes X1 and X2 are only laterally separated by a distance of six inches, making it practically feasible to successively lift every other level of the dual coops in a vertical coop stack by means of two companion lift cylinders, described in more detail hereinafter. Referring to FIG. 7, each of the lift rods 60 is bent near its upper "loop" end such that the upper loop portion of the lift rod lies in fairly close proximity to the inverted divider plate 22. Such relationship facilitates engagement of the lift rods by an associated lift arm assembly, hereinafter described. Further, each of the lift rod members 60 is secured near its lower end to the coop cross bar brace 47 by means of a pair of bias springs 61 (FIG. 15). The springs 61 laterally pull their associated lift rod 60 back into generally vertical alignment with the rear of the coop to which such lift rod member is attached, when the lift rod is released by the lifting arm assembly.

The foregoing description describes the multilayer coop structure mounted on the bed of a transport truck, for transporting turkeys within the plurality of coop columns, for example to a processing facility. As described, all of the dual coops within a vertical column are operatively connected to one another at their front sides by means of the hinges 55 which hinge the bottom of each coop front to the top of the next lower coop front, with the lowermost coop bottom being hinged directly to the trailer bed support surface. In contrast, once the back sides of the coops are released from securement by the coop lock mechanisms 30, the backs of the respective multilayer coops are movable as lifted by the lift rod members 60 such that the coops can be pivotally tilted about their lower front hinged axes.

To simplify the coop construction and the amount of unloading equipment required to be carried by the transport vehicle, the preferred embodiment of the invention places the means for providing lifting force to the lift rod members at the processing plant. By placing the powered lifting apparatus at the plant facility, a single lifting apparatus can be used to unload each truck that enters the processing plant facility, and the pivotally movable coops on the transport truck become passive, relatively inexpensive, instruments for the active movable lifting means of the processing plant. To better understand the nature of the unloading operation contemplated by this invention, a brief description of a typical processing plant wherein the turkeys would be unloaded follows.

Figure 2:
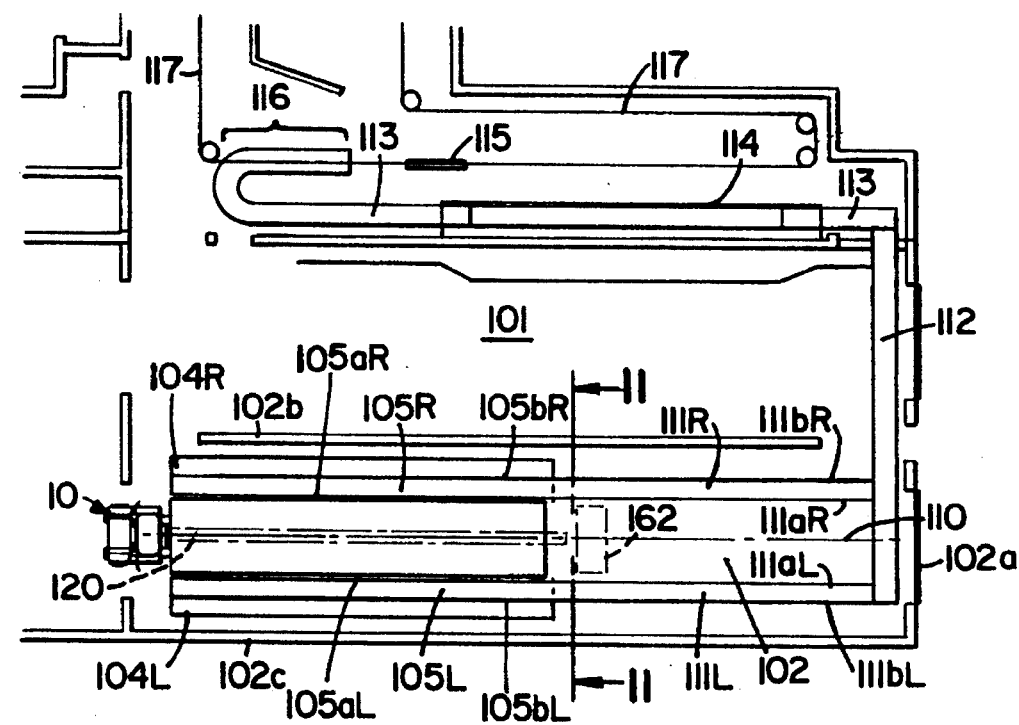
FIG. 2 is a diagrammatic aerial view of an unloading station at a poultry processing plant illustrating how a transport truck such as that of FIG. 1 might be positioned for unloading its contents at the unloading dock in the plant.

Referring to FIG. 2, a processing plant is diagrammatically illustrated at 100. Two unloading dock areas of the plant are generally illustrated at 101 and 102. While both unloading dock areas 101 and 102 may be configured to accommodate unloading equipment per this invention, the unloading process will hereafter be described only with respect to the dock area 102. Transport trucks of the type previously described with reference to FIG. 1, carrying a load of filled turkey coops drive into the unloading dock area 102 through an overhead door $102a$ and are accurately centered within the unloading dock area by means of appropriate wheel guides or the like, such that the longitudinal center of the truck bed and its central support assembly 15 generally align with the longitudinal center 110 of the unloading dock area. The unloading dock area designated 102 can be sized and configured to accept transport vehicles of varied dimensions.

The unloading dock 102 has a pair of vertically movable unloading stations or discharge collectors 103R and 103L aligned along and operatively addressing each side of the transport truck load. Unloading station 103R services unloading of the right (R) side of the transport truck; whereas unloading station 103L services unloading of the left (L) side of the truck. Each unloading station is modular in configuration and includes a mounting platform 104 to which are mounted a first belt conveyor 105 and a coop gate opening assembly 106. Each mounting platform module 104 is operatively connected by means of a cable and winch assembly 107 to a lifting motor 108 and control 109 for raising and lowering the platform module relative to the multilayer coops on the truck. In the preferred embodiment, the back sides of the platform modules 104 engage and slide against lubricated vertical walls $102b$ and $102c$ of the unloading dock area 102. The walls $102b$ and $102c$ form a bearing surface for the platforms 104 and their associated assemblies. It will be understood, that other guide and bearing means for the platform modules 104 could be used. The preferred embodiment also uses a counterbalanced weight system (not illustrated) in association with the cable and winch assembly 107, to reduce the force and thus the size of the lifting motors 108, required to perform the platform raising and lowering functions.

The first belt conveyors 105R and 105L are carried by their respective mounting platforms 104R and 104L in close proximity with the front sides of the coops 40 of the transport load, and are vertically aligned by the movable platforms 104 so as to selectively unload one "layer" of the multilayer coops at a time. Each of the conveyor belts 105 has a hinged bridge or slide member $105a$ hinged to the support structure for the conveyor and longitudinally extending along that edge of the conveyor assembly which is closes to the coop assemblies of the transport truck. A retaining shield or fence is connected to the opposite lateral edge of the conveyor belt 105 and longitudinally extends along the length of the belt, for retainably holding unloaded turkeys on the belt surface as they are carried thereby.

Figure 24A:
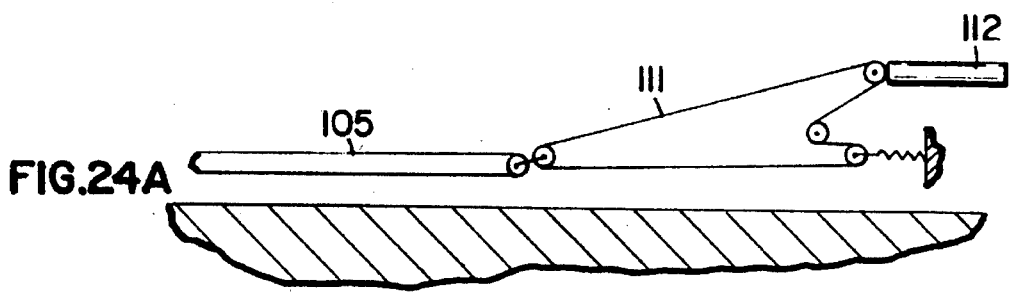
FIG. 24A is a diagrammatic view in side elevation of the unloading and serpentine belt conveyors at the unloading dock of the processing plant of FIG. 2, showing the conveyors in first, lowered positions.
Figure 24B:
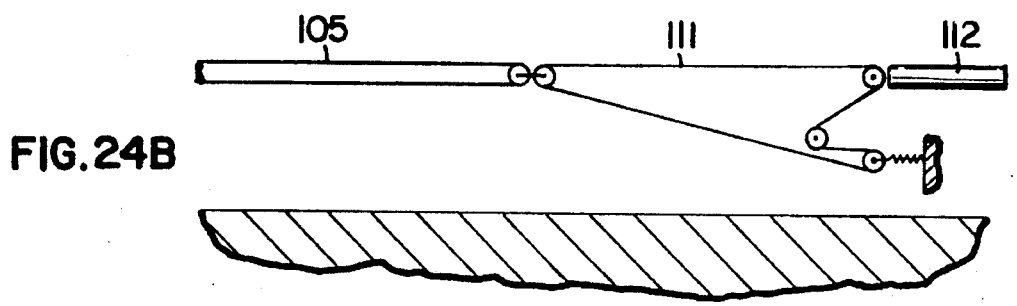
FIG. 24B is a diagrammatic view of the two belt conveyors of FIG. 24A, illustrating the conveyors in second, raised positions.
Figure 25:
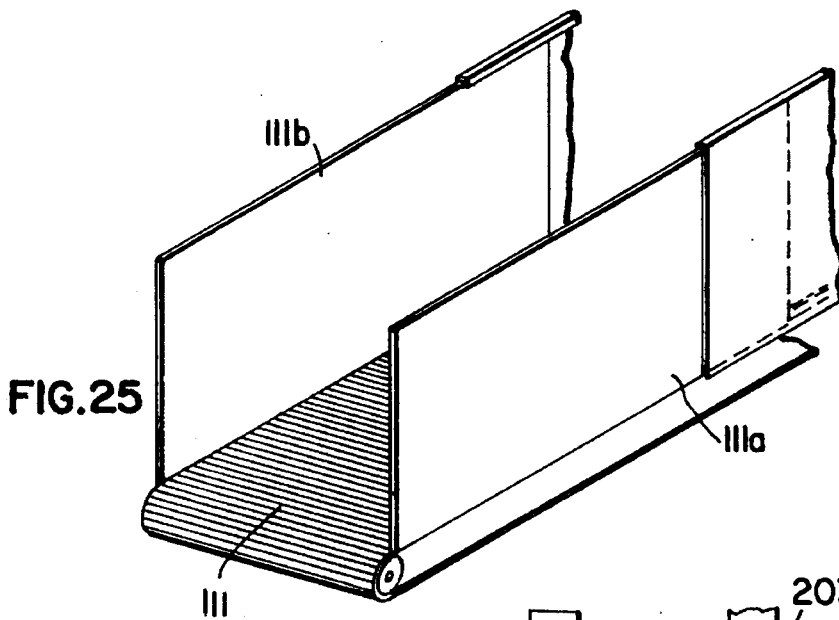
FIG. 25 is a partial perspective view illustrating the guide fences adjacent the belt conveyors of FIG. 2.

Each of the conveyor belts 105 is aligned with operatively connected to a second conveyor belt 111. The left ends of the second conveyor belts 111 (as viewed in FIG. 2) are operatively aligned with and connected for vertical movement with their associated first conveyor belts 105 which are raised and lowered by means of the platform assemblies 104. The second conveyor belt assemblies 111 have their belts connected in serpentine manner (see FIGS. 24A and 24B), such that the operative length of the belt can be made shorter or longer as their left end raises and lowers with movement of the loading platform. The right ends of the second conveyor belt assemblies 111 are fixed at a vertical height which lies above that of the multilayer coops of the truck. Each of the conveyor belt assemblies 111 has a pair of retaining shields or fences $111a$ and $111b$ longitudinally extending therealong to retainably hold the turkeys on the upper moving belt surface. A diagrammatic illustration of the second conveyor belt 111 and its associated retaining shield members is illustrated in more detail in FIG. 25. The shield members $111a$ and $111b$ of the second conveyors are configured in telescoping fashion, such that they can overlap with one another in telescoping fashion, on either side of the belt as the belt lengthens and shortens in response to vertical movement of its left end with the mounting platform 104. The serpentine configuration for a conveyor belt assembly such as that described with reference to the belt assembly 111 is well-known in the art, and will not be detailed herein. Such assembly is schematically illustrated in FIGS. 24A and 24B. In general, the left end of the conveyor assembly is operatively connected for vertical movement with the conveyor 105, and the vertical height of the right end of the conveyor is fixed. As the left end of the conveyor 111 is moved vertically upward, the horizontal "length" of the upper surface of the conveyor shortens, and the slack is taken up by the spring biased take-up reel assembly as diagrammatically illustrated in the figure.

The second conveyor assemblies 111 are, in the preferred embodiment, orthogonally oriented relative to a third transport conveyor 112 which receives turkeys deposited from the conveyor belts 111 and carries them into the processing plant proper. The vertical height of the conveyor belt 112 lies above the opened door 102a of the unloading dock, to enable the truck 10 to drive into the unloading dock area, beneath the conveyor assembly 112. The sides of the conveyor 112 also include retaining shields or fence members (not illustrated). Alternatively, both the sides and the top of the conveyor assembly 112 could be enclosed to prevent any possibility of turkeys leaving the moving belt 112. In the plant configuration illustrated in FIG. 2, a fourth conveyor belt 114 accepts turkeys carried by the belt 112 within the processing plant.

The present invention contemplates self-unloading of the turkeys from their transport coops onto the conveyor belts 105, 111, 112 and 113 such that the turkeys are maintained in an upright standing condition all the way to an anesthetizing station 114 within the processing facility. Accordingly, no physical labor other than the control operator is required to unload the turkeys from the transport vehicle, and the turkeys are delivered in untraumatized manner by the conveyor belts to the anesthetizing station which is located in close proximity to the slaughtering station 115. Since the turkeys are brought into the processing facility in an upright manner, the turkeys can defecate while standing on the conveyor belts, thereby emptying their large intestines prior to being placed in inverted position in leg shackles. Such fecal matter can be continuously cleaned from the belts and from the turkeys prior to processing. The invention contemplates anesthetizing the turkeys within the processing plant while being transported on the conveyor 113 such that the limp turkey can easily be placed in confining shackles at the shackling position 116, immediately before movement of the shackled turkey to the slaughter station 115. The endless shackle conveyor is indicated in the FIG. 2 diagram at 117. With the present invention, it is expected that due to the emptying of the bird's large intestine prior to being shackled, little contamination due to leaking fecal matter onto the meat during processing will be experienced.

Figure 11B:
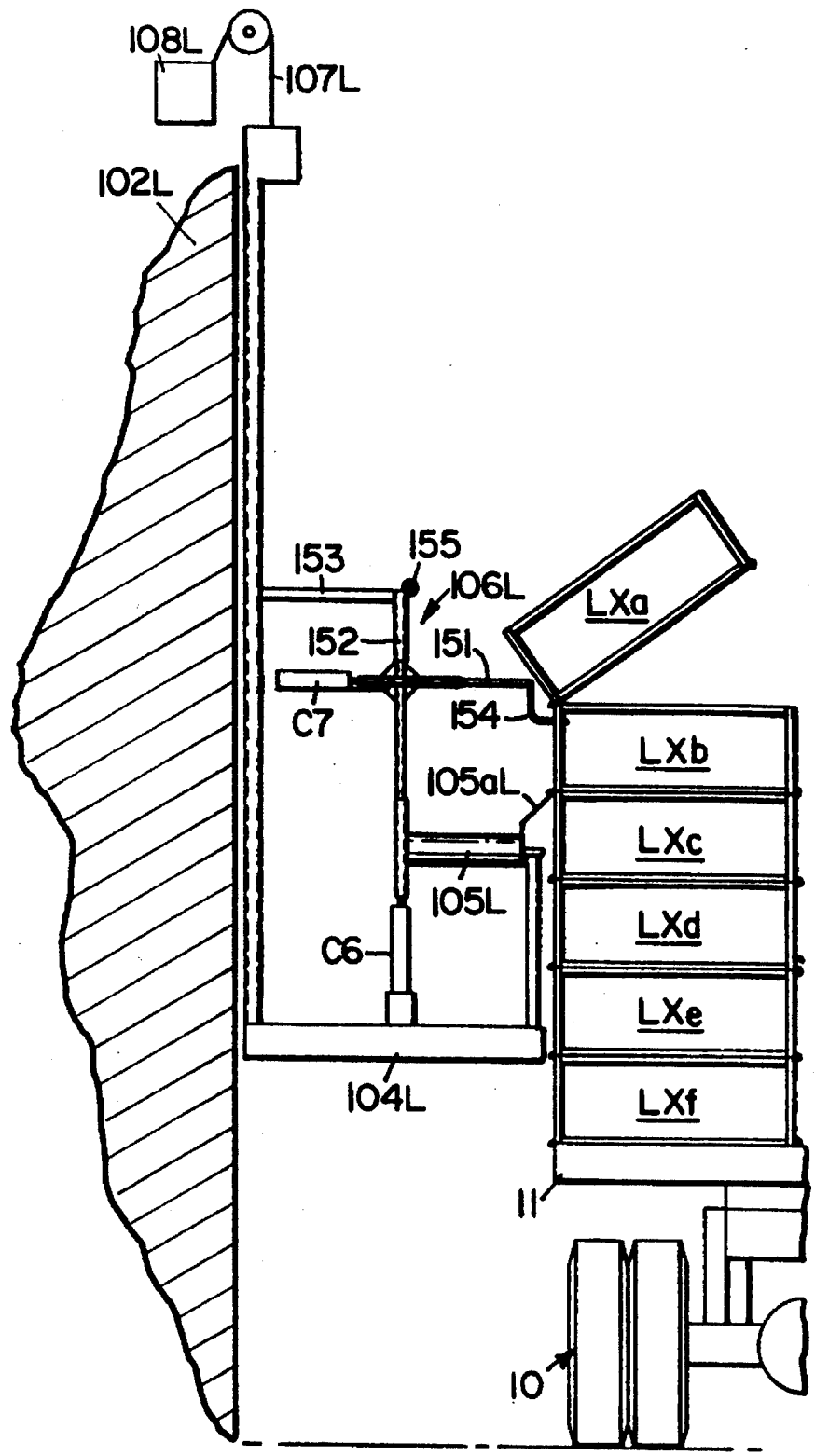
FIG. 11B is a partial diagrammatic end view similar to that of FIG. 11A, of one-half of the multilayer coops, illustrating the positional alignment of the coop gate opening and belt conveyor assembly as such assembly would appear just after opening of the coop gate of the coop second from the top.

Referring to FIGS. 2, 3 and 11 when the transport vehicle 10 is moved into the unloading dock area 102, it will be generally centered on the longitudinal center 110 of the unloading dock area. A lift assembly schematically illustrated at 120 in FIG. 2 is mounted to an overhead support wall 102d in the unloading dock area and is generally longitudinally aligned along the longitudinal center 110 of the dock area. The lift assembly 120 is mounted at an elevation so as to permit the multilayer coops 40 of the transport vehicle 10 to pass unimpeded thereunder, and such that the lift assembly 120 generally aligns with the longitudinal center and support assembly 15 of the transport vehicle.

Figure 8:
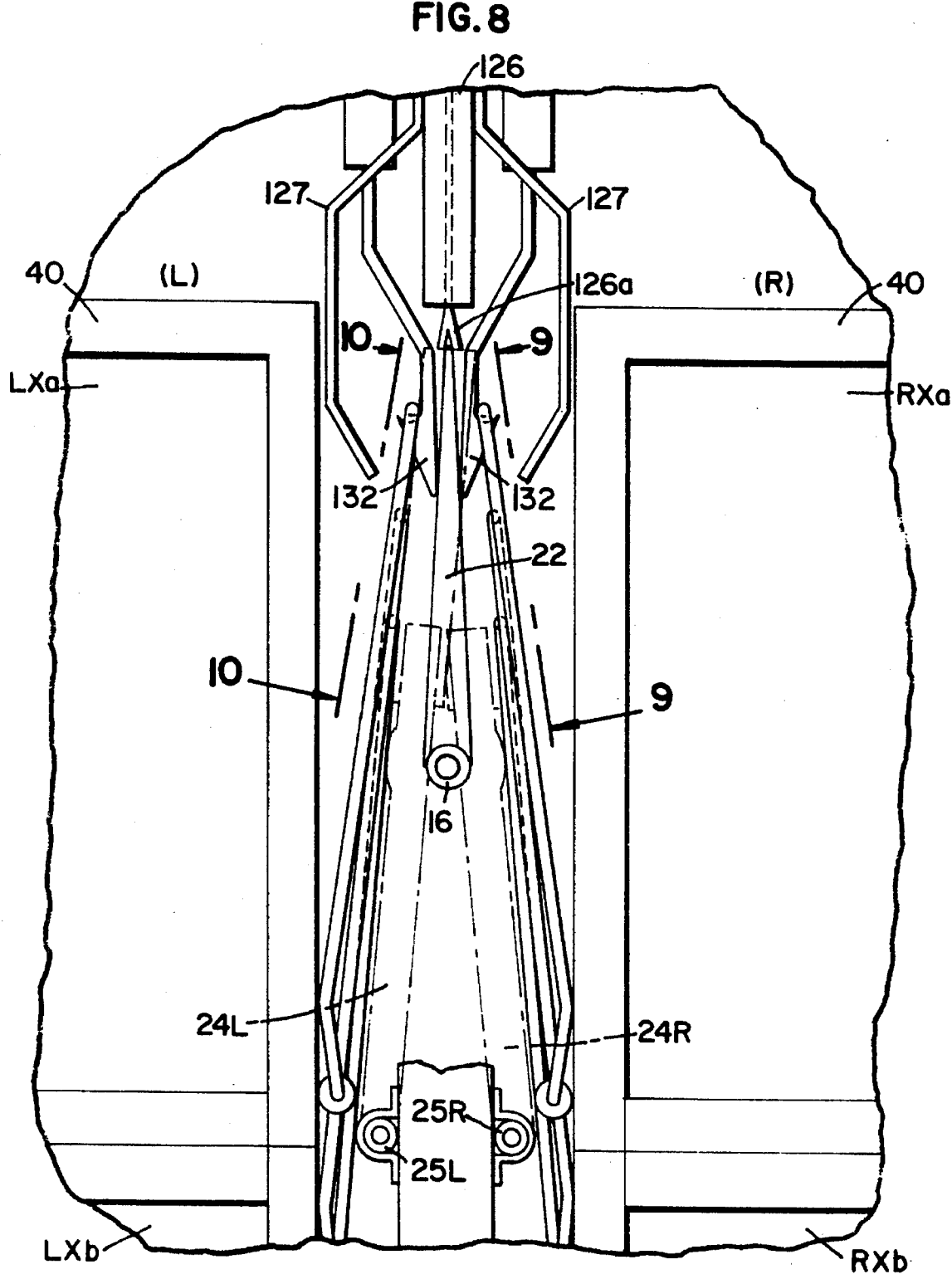
FIG. 8 is a view of the apparatus of FIG. 7, illustrating the hydraulic coop lifting assembly positioned in a second, lowered position.

The lift assembly 120 (FIG. 3) includes a support beam 121 carried by a plurality of roller members 122 to enable longitudinal movement of the support beam 121. The support beam 121 is generally longitudinally aligned with the longitudinal center 110 of the unloading dock area. A hydraulic alignment cylinder C1 is connected between the support beam 121 and the unloading dock support structure 102d for longitudinally moving the support beam 121 as guided by the roller assemblies 122 into accurate alignment with the multilayer coop load of the truck. A channel support bar 124 is suspended from the overhead support beam 121 by means of a pair of hydraulic cylinders C2 and C3. In the preferred embodiment, the hydraulic cylinders C2 and C3 preferably have an 8 inch cylinder stroke for raising and lowering the channel support bar 124 by that amount in the vertical direction. The support rods 125 for the hydraulic cylinders C2 and C3 are pivotally hinged to the support beam 121 to allow lateral movement of the channel support bar 124 relative to the longitudinal center 110 of the unloading dock area. A plurality of lift hook divider and guide plates 126 are mounted to the elongate channel support bar 124 at spaced positions therealong, as indicated in FIG. 3. In the preferred embodiment, there are five lift hook divider and guide plates 126 spaced at 8 foot intervals along the channel support bar 124 and are configured for operative mating engagement with the five inverted V-shaped divider plates 22 of the transport vehicle central support assembly 15. Each of the lift hook divider and guide plates 126 includes a pair of spring steel guide rods 127 secured to their respective side edges and extending downwardly therefrom (as best illustrated in FIG. 7). The spring steel guide rods 127 are designed to engage the upper rear edges of the top coops as the lift hook divider and guide plates 126 are lowered toward the coop assembly, so as to center the respective life hook divider and guide plates 126 with the inverted V-shaped divider plates 22 of the transport vehicle. The lower terminus of each lift hook divider and guide plate 126 includes an inverted V-notched portion 126a which is configured to matingly engage the upper edge of the inverted divider plates 22 (as illustrated in FIG. 8) when the lift hook divider and guide plate 126 is lowered into operative engagement with its respective divider plate 22. FIG. 7 illustrates the situation wherein the lift hook divider and guide plate 126 is being lowered into alignment position with the divider plate 22. FIG. 8 illustrates the final resting operative position of the lift hook divider and guide plate 126 when it is fully operatively engaged with its associated divider plate 22 and is operatively centered between the backs of the opposed coops defining the left (L) and right (R) rows of coops carried by the transport vehicle.

Figure 23A:
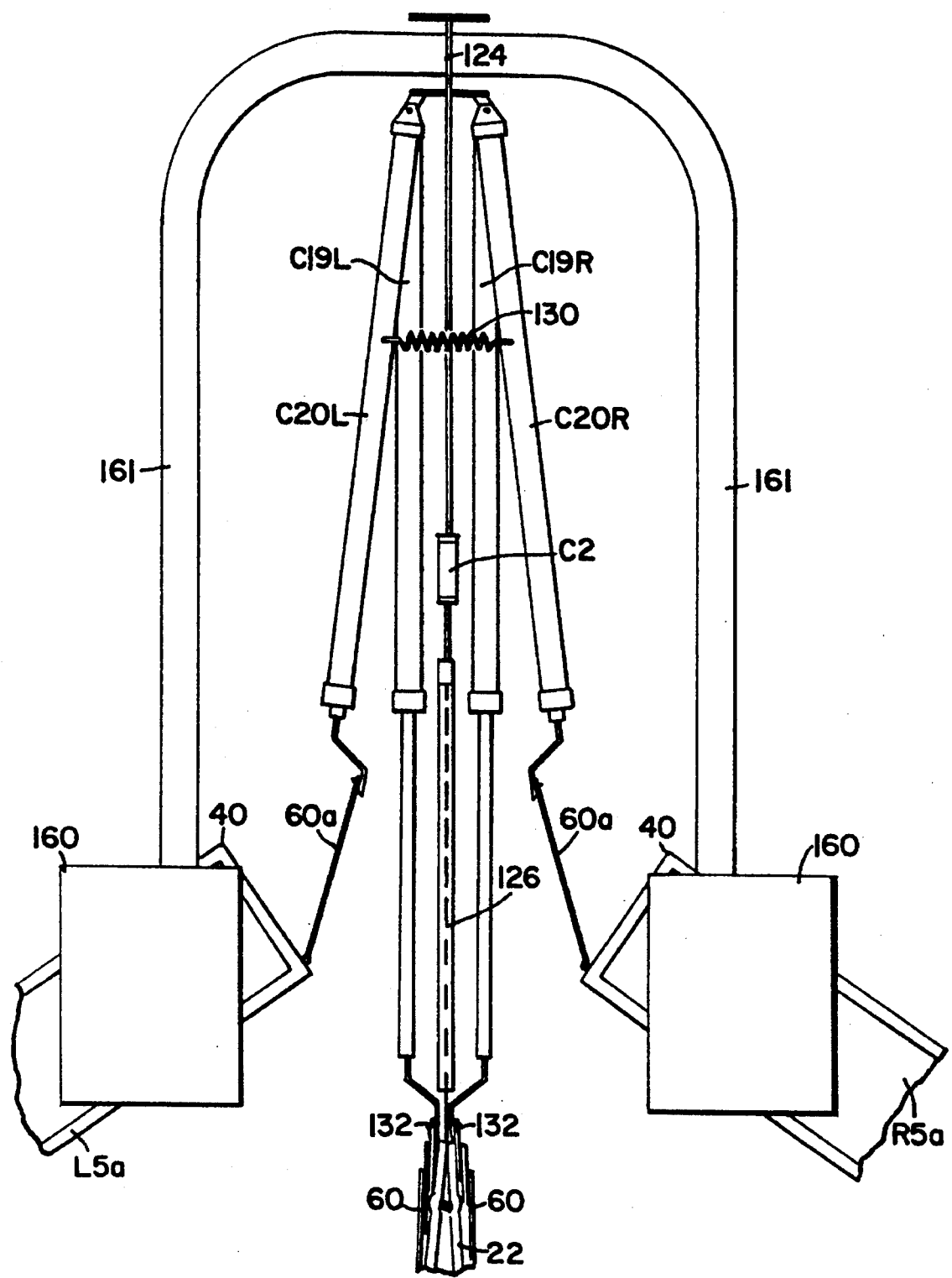
FIG. 23A is an enlarged end view of the hydraulic coop lifting assembly of FIG. 3, illustrating an operator control panel therefor.

Two pairs of hydraulic lift hook cylinders are pivotally mounted to the support beam 121 overlying each of the lift hook divider and guide plates 126. One-half of the hydraulic lift hook cylinders are illustrated in FIG. 3. As illustrated in FIG. 3, the back of the transport vehicle 10 is positioned to the left of the figure; whereas the front of the vehicle is positioned to the right of the figure. Accordingly, the figure illustrates the backs of the coops forming the left (L) side of the load carried by the transport vehicle, and their associated lift rod members 60. The lift hook cylinder pairs are indicated in FIG. 3 at C11–C20 wherein each cylinder numerical designation represents a pair of such cylinders. For example, in FIG. 3, each of the cylinders C11–C20 is followed by an "R" designation (i.e., C11R–C20R) to indicate that that one of the cylinder pairs illustrated is positioned to lift coops from the right (R) side or row (not illustrated) of multilayer coops. That matching cylinders of each cylinder pair which are not illustrated in FIG. 3 but which are located "behind" the divider plates 126, and which would lift the left (L) row of multilayer coops are designated by the appropriate C11L–C20L designation. An end view of a pair of lift hook cylinders as viewed from the back of the transport vehicle is illustrated in FIG. 23. Referring thereto, the C20R and C20L pair of lift hook cylinders is illustrated as the rearmost cylinder pair; whereas the C19R and C19L pair of lift hook cylinders is illustrated as the second pair of cylinders. These two pairs of lift hook cylinders operatively lift the two multilayer columns of coops indicated by L5 and R5 on the transport vehicle. Each pair of lift hook cylinders (such as C20R and C20L) are pivotally connected to the support beam 124 at their upper ends and are biased toward one another by means of a spring member, generally indicated at 130 in FIG. 23. In the preferred embodiment, the lift hook cylinders have a piston travel of 34 inches and do not permit their cylinder pistons to rotate. Each of the lift hook cylinder pistons terminates at a hook member 132 that cooperatively slides along the broad guide surface of the lift hook divider and guide plate 126 with which it is associated, and continues downwardly along the respective guide surface of the inverted divider plate 22 when operatively positioned as illustrated in FIG. 8. The hook member 132 is wedged-shaped at its lower extremity and includes a barbed portion which operatively engages and hooks the loop portion of the lift rod 60 with which it is aligned. It will be noted that the lift hook cylinders servicing each side or row of multilayer coops are aligned such that their hook members 132 vertically travel along the axes X1 and X2, as illustrated in FIG. 9. The hook lift cylinders on the same side of each hook lift divider and guide plate 126 and associated divider plate 22 are alternately energized to sequentially lift the backs of the dual coops in the vertical coop column associated therewith, from top to bottom, as hereinafter described in more detail.

The mounting platforms 104 each carries, a hydraulically operated gate opening assembly 106 for hydraulically opening the front gate members 49 of the multilayer coops 40. In a preferred configuration of such assembly, the gates of all coops at a given level of a row of such coops are all simultaneously opened by the gate opening apparatus 106; however, such need not be the case. The coop gate opening assembly 106 is diagrammatically indicated in end view in FIGS. 11A–11C as being operatively mounted to the movable platform 104. Operation of the lifting motors 108 so as to raise and lower the platform framework 104 is under control of the unloading dock operator. Referring to FIG. 12, it will be noted that the coop gate opening assembly 106 includes a plurality of gate operator arms 151 for lifting each gate of the coops at a given level within a row of coops. In the preferred embodiment, there are 11 such operating arms for opening the coop gates of a particular row of the five columns of aligned dual coops. One each of such operator arms 151 is located at the front and rear ends of the row of coops, and one each is located at the center of each dual coop and at the intersections between adjacent columns of coops. Each gate operator arm 151 is mounted from below to the movable support platform 104 by means of a hydraulic cylinder C6 that operatively raises and lowers the operator arm relative to the platform. The upper end of the operator arm is supported by a vertically oriented sleeve guide 152 that is secured to the sidewall of the platform 104 by means of a lateral support brace 153. Rollers 155 are operatively mounted at the juncture of braces 152 and 153 for supporting the column of tipped coops when they go "over-center" during the unloading operation. Each operator arms 151 is also operatively laterally movable relative to its vertical sleeve guide support by means of a hydraulic cylinder C7 that moves the operator arm 151 toward and away from engagement with its associated coop gate 49. The C7 cylinders are not mounted to the sidewall of the mounting platform but freely move in the vertical direction relative to the sidewall. Each coop operator arm 151 further has one or a pair of insert plate tabs 154 which are cooperatively insertable within the plurality of outer openings 50a and 50b in the grid portion of the coop gates 49. The horizontal braces 153 terminate at support tubes 155 for supportively engaging a column of coops by their front upright support standards 41 when they pivot to an over-center position as, for example, illustrated in FIG. 11C.

It will be appreciated that while the coop gate opening assembly 106 automatically opens all of the gates 49 in a level of coops at one time, the gates could equally well be sequentially opened just prior to tilting of a coop, or could be manually opened.

The operator control panels 160 for operating the pairs of hydraulic lift hook cylinders (C1–C20), the mounting platform motors 108, the alignment and lowering of the lifting assembly via C1–C3, and the gate opening cylinders C6 and C7 are, in the preferred embodiment, mounted to the support beam 124 by means of a pair of support tubes 161 that downwardly depend toward the floor illustrated in FIG. 23 so as to be accessible to an operator at the rear of the transport vehicle 10 when positioned within the unloading dock area 102 of the processing plant. An operator platform, diagrammatically indicated at 162 in FIG. 2, is moved into position behind the truck 10 to be unloaded and is raised to the proper height to enable the operator to clearly view operation of all components controlled by the control panel 160. The platform 162 also enables the operator to easily view the unloading status of individual tilted coops during the unloading process. As illustrated in FIG. 23, the control panel 160 includes hydraulic actuator lifting and lowering valves for each of the cylinder pairs C11–C20 for both the left (L) and right (R) rows of coops. An operator standing on such operator platform has access to not only the power controls of the system, but also to the crank handle 32 for the coop lock mechanisms and the operator lever arms 26 for the hook rod release spreader arms 24.

Figure 27:
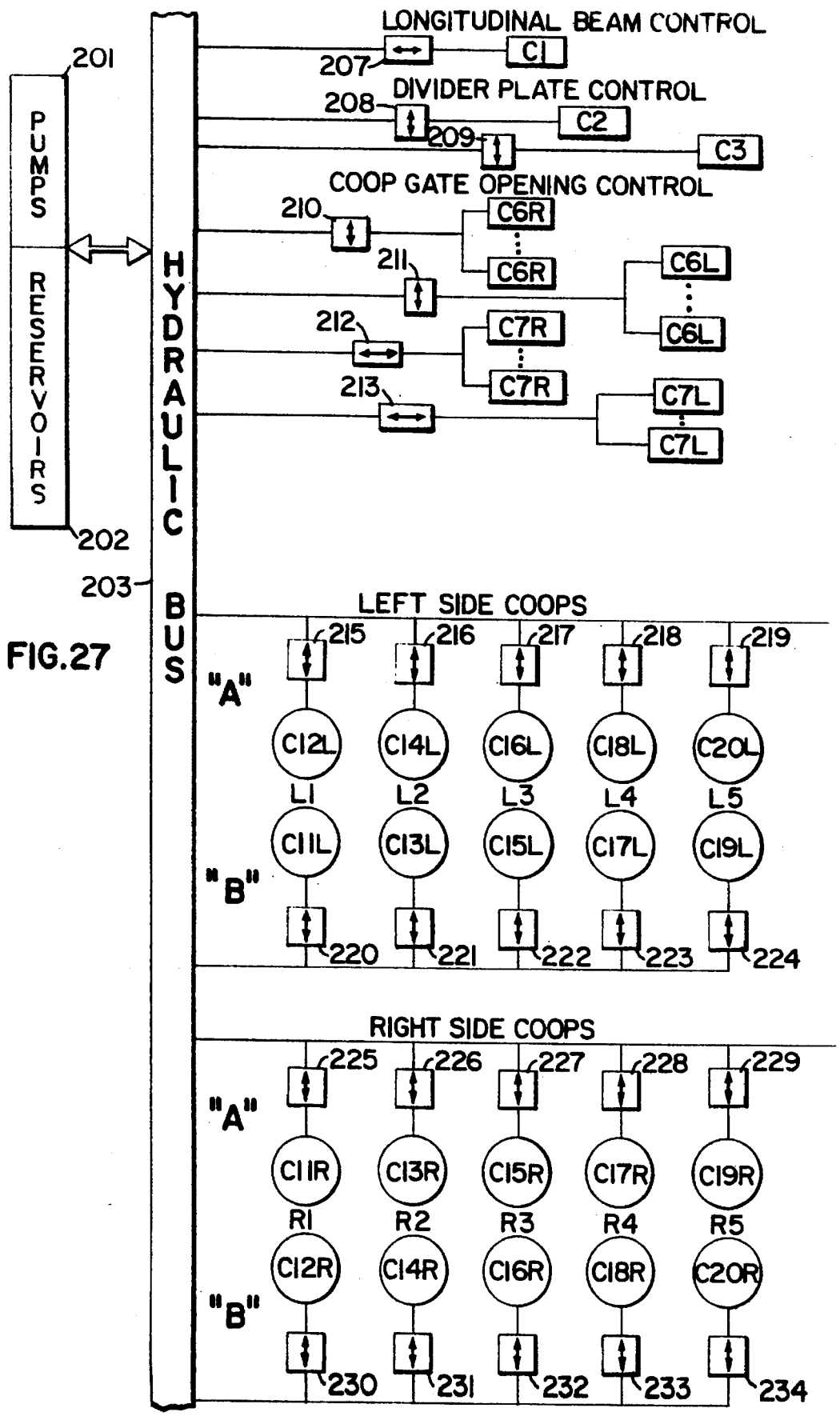
FIG. 27 is a functional schematic block diagram of the hydraulic networks for the coop lifting assembly of the first preferred embodiment.
Figure 28:
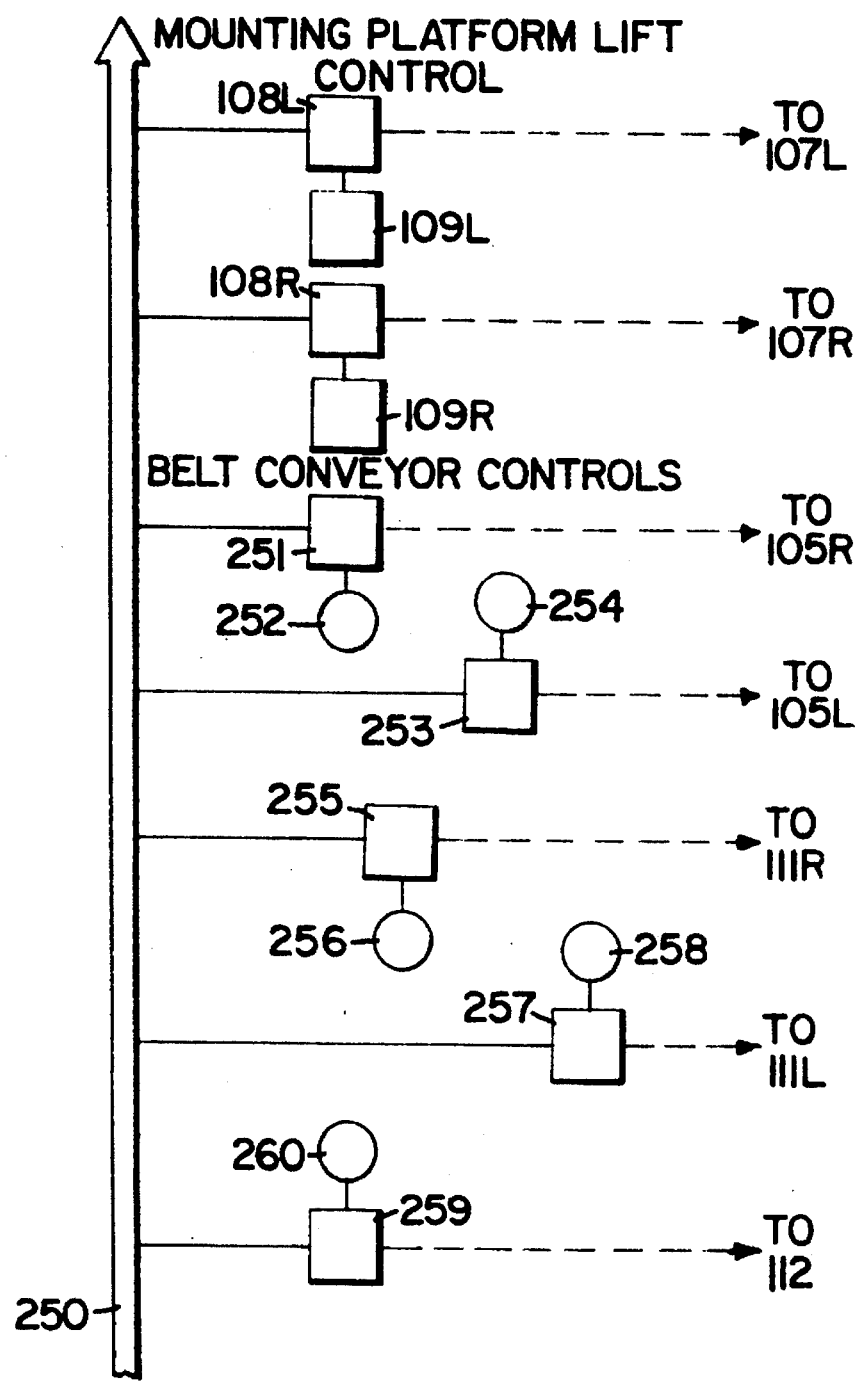
FIG. 28 is a functional block diagram of the electrical circuits for the coop lifting assembly of the first preferred embodiment.

Schematic block diagrams of the hydraulic and electrical networks for operating the various hydraulic cylinders and electrical components of the system are respectively illustrated in FIGS. 27 and 28. The diagrams of FIGS. 27 and 28 are functional in nature, it being understood that those skilled in the art can readily implement true hydraulic and electrical schematic diagrams and networks from the functional blocks illustrated.

Referring to FIG. 27, one or more hydraulic pumps and reservoirs are provided and are schematically illustrated at 201 and 202 respectively. The number and type of such pumps and reservoirs required will depend upon the particular selection and arrangement of hydraulic cylinders and other components used throughout the system. In FIG. 27, the pumps and reservoirs are illustrated as communicating with a hydraulic bus line, generally indicated at 203. The individual hydraulic control members and hydraulic cylinders are operatively supplied from the hydraulic bus 203. Longitudinal movement of the support beam 124 is provided by means of the longitudinal beam control hydraulic cylinder C1, operated by a control module 207 which is connected to the hydraulic bus 203. Lowering and raising of the lift hook divider and guide plates 126 is controlled by means of the Divider Plate Control hydraulic cylinders C2 and C3, which are respectively activated by means of control modules 208 and 209 operatively connected to the hydraulic bus 203.

Operation of the Coop Gate Opening Control assembly is performed by a plurality of hydraulic cylinders, generally indicated by the reference numerals C6 and C7. The C6 cylinders for raising and lowering the gate members on the right side of the coop assembly are generally indicated by the designation C6R, and are in the preferred embodiment commonly activated by the control module 210. In the preferred embodiment, there are 11 of the C6R cylinders. Similarly, the left side coop gates are raised by means of the cylinders designated as C6L in FIG. 27, and are activated by means of the operator control module 211. In the preferred embodiment, there are also 11 of the C6L hydraulic cylinders. Similarly, horizontal movements of the gate opening operator arms are controlled by the plurality of C7 hydraulic cylinders. Eleven of such cylinders for controlling operation of the gate opening operators on the right side of the coop assembly are indicated at C7R, and are activated by means of the operator control module 212. The 11 hydraulic cylinders controlling lateral movement of the gate opening operators on the left side of the coop assembly are indicated at C7L and are activated by means of the operator control module 213. The C6 and C7 cylinders are connected to the hydraulic bus 203 by means of the operator control modules 210, 211, 212 and 213.

The 10 pairs of lift hook cylinders C11 through C20 are indicated in FIG. 27 as operatively connected through their respective hydraulic control modules to the hydraulic bus 203. Those lift hook cylinders of each cylinder pair which are associated with lifting coops on the left (L) side of the coop assembly are followed by an "L" designation; whereas those cylinders of the pairs that are associated with lifting coops on the right (R) side of the coop assembly are followed by the designation "R".

Referring to FIG. 27, the individual hydraulic cylinders representing the "A" and the "B" lifting sequences (hereinafter described in more detail) are illustrated as grouped together. The "L1–L5" and "R1–R5" designations in FIG. 20B represent the five left side and five right side multilayer columns, as defined in FIG. 1. The lift cylinder C12L is connected by means of its control module 215 to the hydraulic bus 203. The lift cylinder C14L is connected by means of its control module 216 to the hydraulic bus 203. The lift cylinder C16L is connected by means of its control module 217 to the hydraulic bus 203. The lift cylinder C18L is connected by means of its control module 218 to the hydraulic bus 203. The lift cylinder C20L is connected by means of its control module 219 to the hydraulic bus 203. Similarly, for the "B" lifting units for the left side coops, the lift cylinders C11L, C13L, C15L, C17L and C19L are connected by means of their respective control modules 220, 221, 222, 223 and 224 to the hydraulic bus 203.

Similarly, the "A" lifting members for the coops on the right side of the assembly have their lift cylinders C11R, C13R, C15R, C17R and C19R respectively connected by means of their respective control modules 225, 226, 227, 228 and 229 to the hydraulic bus 203. The "B" lifting members for the right side of the coop assembly represented by the lift cylinders C12R, C14R, C16R, C18R and C20R are connected by means of their respective control modules 230, 231, 232, 233 and 234 to the hydraulic bus 203.

The functional block diagram for the electrical components and their associated control switches of the preferred embodiment is illustrated in FIG. 28. Referring thereto, the electrical bus power line is diagrammatically illustrated at 250. The motor 108L for lifting the left mounting platform is operatively connected to the bus 250 and is controlled by means of a switch control 109L. The lifting motor 108R for raising and lowering the mounting platform 104R is connected for energization to the bus 250, and is controlled by means of the switching control 109R.

The belt conveyors are indicated as being controlled by a plurality of electric motors, each having a switch control associated therewith. The left belt conveyor 105R is controlled by means of a motor 251 and its associated switch control 252. The left belt conveyor 105L is controlled by means of a conveyor motor 253 and its associated switch control 254. The right side conveyor 111R is controlled by means of a conveyor motor 255 and its associated switch control 256. The left conveyor 111L is controlled by means of a conveyor motor 257 and its associated switch control 258. The collection conveyor 112 is controlled by means of a conveyor motor 259 and its associated switch control 260. All of the conveyor motors are illustrated as being operatively connected to the electrical bus 250, as indicated in FIG. 28.

In operation, the transport truck 10 is driven into the unloading dock 102 of the processing plant and is positioned, by way of wheel alignment markers or the like, centrally of the unloading station. The left and right mounting platforms 104 and their associated components are elevated above the level of the coop columns of the transport truck, to enable unimpeded passage of the truck into the unloading area. Similarly, the overhead lift assembly 120 is sufficiently elevated so as to allow for unimpeded movement of the transport truck and its load therebelow. When the truck has been positioned for unloading, the operator platform 162 is moved into position adjacent the rear of the truck (as indicated in FIG. 2) and is elevated so that the operator can reach the control panels 160 (FIG. 23) for the unloading assembly. The operator platform 162 is sufficiently extendable so as to enable an operator to adequately view the entire load of coops, from slightly above the uppermost coop.

The operator first unlatches the coop locking mechanisms by turning the crank handles 32 at the rear of the load so as to disengage and move the plurality of locking cross-arm members 33 (FIG. 14) from engagement with the back upper edges of the coop columns. The coops are now free to pivot about their respective hinged front ends. The operator then activates the control panel 160 so as to lower the platform assemblies 104 on either side of the coop columns such that the conveyor belts 105 are respectively aligned with and slightly below the floors of the uppermost coops of the multilayer coop columns. The hinged conveyor bridge or slide surfaces 105a are then pivotally moved into resting engagement against the front gate members of the coops, and the platform assemblies are accurately lowered until the bridge members come into resting engagement just below the gate members of the uppermost row of coops. The conveyors are now in position for accepting turkeys from the uppermost level of coops, and are energized for movement.

The operator next aligns the lift cylinders carried by the support bar 124 with the lift rods of the coop columns, by longitudinally moving the support bar 124 by means of the cylinder C1. When properly aligned, the operator lowers the lift hook divider and guide plate assemblies 126 by activating the cylinders C2 and C3 until the divider and guide plates 126 cooperatively engage the inverted V-shaped divider plates 22, as illustrated in FIG. 8. The spring steel guide rods 127 engage the upper inner edges of the coop columns during the decent process, to laterally guide the lift hook divider and guide plates 126 into cooperative engagement with the divider plates 22.

The operator next activates the gate opening mechanisms to open the gates of the upper row of coops. If not already in such position, the gate lift arms 152 are lowered by means of the cylinders C6 such that their insert plate tabs 154 are vertically aligned with the notched openings 50a and 50b at the bottom of the coop gates 50. The cylinders C7 are then activated to laterally move the insert plate tabs 154 into the gate openings 50a and 50b, and the cylinders C6 are again activated to lift the coop gates into an open position. The cylinders C6 and C7 are cooperatively operated so as to engage the lifted gates with their respective latch members 54 so that the gates will not reclose when the coops are tipped. Following the latching operation, the gate lifting arms are retracted, and the uppermost row of coops are ready for unloading.

The operator then lowers the "A" cylinders on each side of the load of coops so as to operatively engage their respective lift rods for the uppermost row of coops. The operator can sequentially energize the "A" cylinders so that only one dual coop is emptied at a time, or can energize all of the "A" cylinders on one side of the load so as to empty the entire left or the entire right side of the load at a time. Once the hook members 132 of the lifting pistons have been engaged with their respective coop lifting rods 60, the "A" cylinders are energized to lift (tilt) the backs of their respectively engaged coops of the upper level, to gently empty by gravity the contents of the tilted coops onto the conveyor belts 105 (see FIG. 6A). Coop vibrators 59 may be activated to assist in urging the turkeys from the coops and onto the conveyors. The bridge members 105a allow the birds to freely slide from the tilted cages and onto the conveyor belts 105. The conveyor shields prevent the turkeys from falling off of the moving conveyors as they progress into the processing plant. In the preferred embodiment, the lift arms accurately tilt the coops during unloading from about 30 degrees to 35 degrees about their hinged front axes.

After all of the upper level of coops have been emptied, the operator activates the "B" lifting cylinders so as to respectively lower such cylinders into operative engagement with the lift hooks 60b which are attached to the second layer of coops. Before lifting the second layer of coops, the platform assemblies on both sides of the load are lowered until the bridge or slide members 105a and 105b are operatively aligned below the gates of the second row or level of coops. The gate opening assembly is again operated to open the gates of the second row of coops. Following opening of the gates, the operator energizes either simultaneously or selectively, the "B" cylinders so as to lift the backs of the second row of coops to their tilted unloading positions. The second row of coops are lifted until the top of the second row of coops comes into supportive engagement with the bottom of the uppermost coop of that coop column, as illustrated in FIG. 6B. In such position, the A lift cylinders can then be lowered and released from engagement with their respective lift rods 60a, such that the B cylinders will then be entirely supporting both the uppermost and the second rows of coops, as illustrated in FIG. 6B. The spring members 130 will pull the released A cylinders back toward their respective divider plates 22 such that the A cylinders can then be lowered to engage the lift rods 60c of the third row of coops.

Figure 11C:
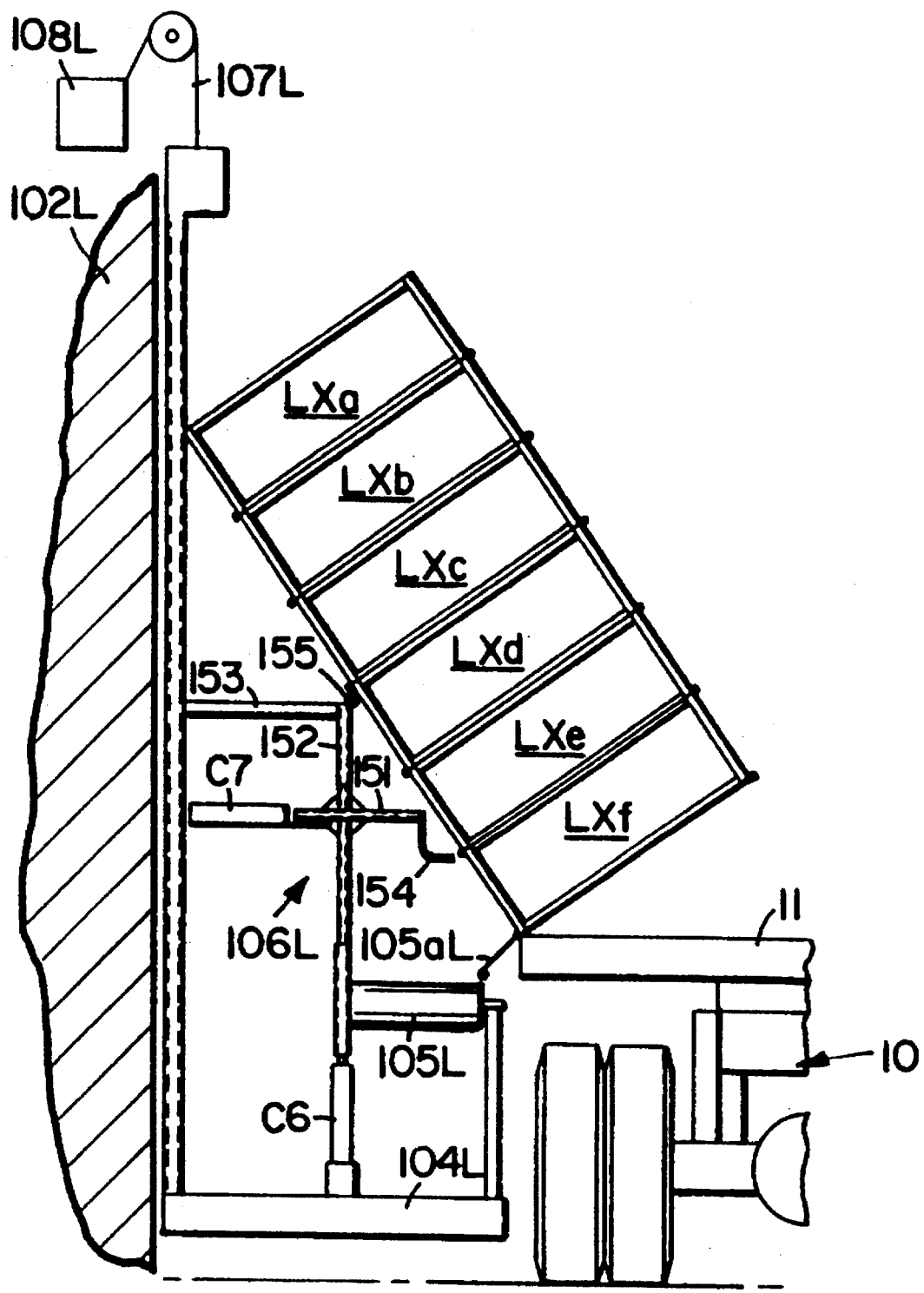
FIG. 11C is a partial diagrammatic end view similar to that of FIG. 11A, of one-half of the multilayer coops, illustrating the positional alignment of the coop gate opening and belt conveyor assembly as such assembly would appear immediately following completion of emptying of the lowermost coop of the multilayer column of coops.

The coops are thus systematically unloaded by sequential operation of the A and B cylinders as above described, until all of the coops have been emptied and are in a tilted position as indicated in FIG. 11C. In such position, the B cylinders will be operatively engaged with the lifting rods 60f of the lowermost row of the coops. The coops of the coop column will be tilted over-center and will be resting upon the rollers 155 of the platform assemblies 104. To reposition the coops onto the transport trailer support bed 11, the bridge or slide members 105a and 105b are first pivoted back so as to overlie their respective conveyors 105, the platforms 104 are slowly raised, and the B lift cylinders are simultaneously activated to lower the coop columns gently back into engagement with the trailer bed 11. The platform assemblies 104 are then raised up above the level of the coops, in preparation for unloading of the next truck.

During lower of the lifting cylinder pistons, their respective hook members cooperatively slide along the inverted V divider plates 22 until they engage their respective lift rods 60. The lift rods 60 are formed from spring steel and are slightly bent so as to be biased into retaining engagement with the divider plate 22 when its associated coop is in an untilted position. When the lift rods 60 are released from engagement with a lifting cylinder hook of a tilted coop; the lift rod 60 springs back into engagement with the back of its associated coop, so as to be out of the way for movement of the lifting cylinders for lifting successively lower coops. To assist in urging the lifting rods 60 against the divider plate 22 so as to further attract the lifting rods 60. The B cylinder hooks 132 are released from the lowermost lift rods 60f when the coop column has been repositioned on the trailer bed by means of the hook rod release arms 24, which are moved by the operator by means of the activator levers 26 located at the rear of the track trailer load. Once the B lift cylinders have been released from the coop assembly, the entire lifting assembly can be raised by means of the cylinders C2 and C3, out of engagement with the coop load, for receipt of the next transport vehicle. The coop load is then reanchored to the truck bed by means of the coop lock mechanism 30 by rotation of the crank handles 32.

It will be appreciated that when the birds exit the coops and are carried by means of the conveyors 105, 111, 112 and 113 into the processing plant, they are in a standing position and are free to defecate along their transport path before being placed into leg shackles, thereby emptying their large intestines prior to the processing procedure. As can also be appreciated by those skilled in the art, the entire unloading operation can virtually be accomplished by a single operator without requiring the operator to touch any of the birds being unloaded, thereby significantly reducing the intensive and expensive manpower required to heretofore perform the unloading operation, and the incident liability attached thereto.

Figure 26:
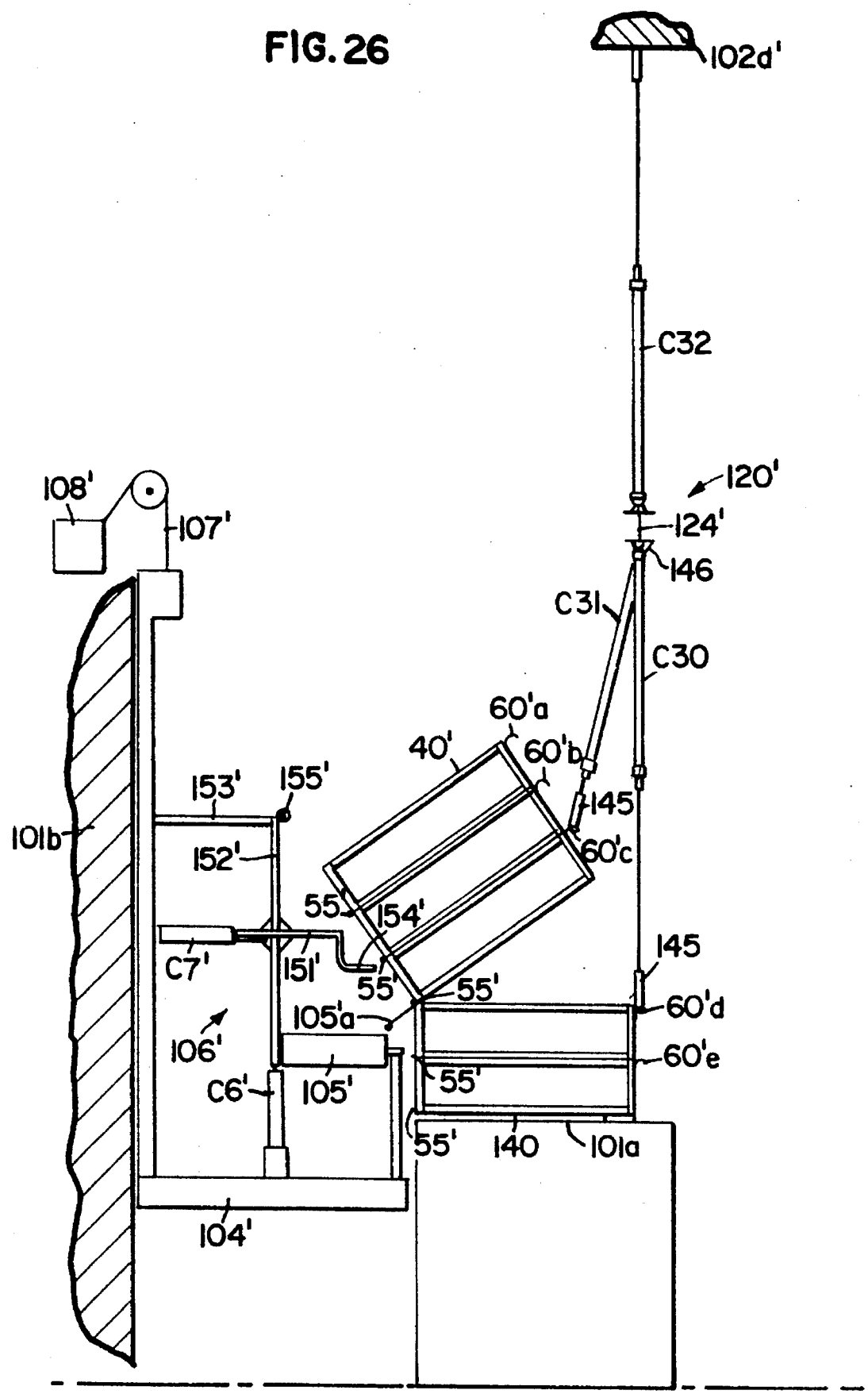
FIG. 26 is a diagrammatic side elevational view of a second embodiment of a multilayer coop configuration and sequential lifting apparatus therefor.

A second embodiment that employs the principles of the present invention is illustrated in FIG. 26. Referring thereto, those components illustrated which have counterparts in the first embodiment are designated by the same numbers as with the first embodiment, followed by a prime designation. The second embodiment applies to those situations, such as typically used with multilayer chicken coops, wherein an entire loaded column of multilayer coops may be carried from a transport vehicle onto an elevated platform such as 101a of an unloading dock 101 (see FIG. 2). Such a multilayer column of dual chicken coops 40', constructed in manner similar to that described with respect to the turkey coops 40 of the first embodiment, is illustrated in FIG. 26. The column of chicken coops 40' are interconnected by hinges 55' in manner similar to that described with respect to the first embodiment coops. The lowermost coop is directly connected to the pallet member 140, which is configured for ease of lifting by a forklift or the like. The coops are virtually identical, but smaller in size, to those of the turkey coops previously described, except that the lift rod members 60 for the turkey coop configuration have been replaced by a rigid lifting hook 60' affixed to the upper back support of each coop member.

The movable mounting platform 104' and its associated conveyor assembly 105' and coop gates lifting apparatus 106' is virtually identical to that apparatus previously described with respect to the first embodiment of the invention. The hydraulic lift assembly for tilting the coops, generally indicated at 120' differs slightly from that of the first embodiment, in that it is simplified to a pair of lifting cylinders C30 and C31 each pivotally connected to a support beam 124' at their respective upper ends. The hydraulic cylinders C30 and C31 are in the preferred embodiment, 42 inch long cylinders, having their movable piston elements terminating at a hook member 145 designed and configured to cooperatively respectively engage the hook members 60' at the back of the coops 40'. A pair of spring members 146 connected between the support beam 124' and the outer cylinder bodies of the cylinders C30 and C31, bias the cylinders C30 and C31 back to a vertical position when they release from engagement with the hook member 60' at the back of a coop. The support beam 124' is connected by means of a third hydraulic cylinder C32 to an overhead bulkhead 102d' of the loading station facility. In the preferred embodiment, the cylinder C32 also has a 42 inch piston travel.

Figure 29:
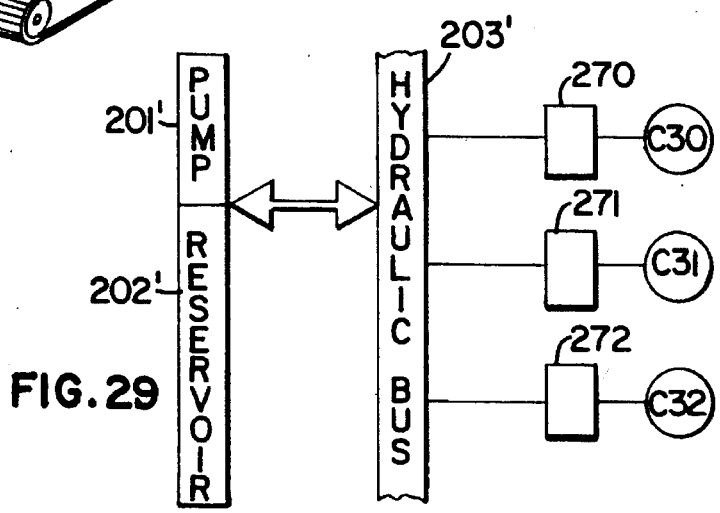
FIG. 29 is a function block diagram of the hydraulic circuits for the coop lifting assembly of a second embodiment of the invention.

The simplified hydraulic control circuit for the second embodiment is illustrated in FIG. 29. The electrical control circuit for operating the platform 104', the coop gate opening hydraulic cylinders C6' and C7' and the conveyor 105' are virtually identical to their counterparts described with respect to the first embodiment, and are not illustrated by separate figure herein. Referring to FIG. 29, the hydraulic pump(s) and reservoir(s) for energizing the hydraulic circuit are schematically illustrated at 201' and 202' respectively. The pump 201' and reservoir 202' are illustrated as communicating with a hydraulic bus line, generally indicated at 203'. The hydraulic cylinder C32 for lowering the support beam 124' is connected by means of a control module 272 to the hydraulic bus 203'. The coop tilting cylinders C30 and C31 are respectively connected by means of control modules 270 and 271 respectively to the hydraulic bus 203'.

In operation, the hydraulic cylinder C32 is activated by means of its control module 272 to lower the support beam 124' sufficiently so that the hook portions of the cylinders C30 and C31 are operatively aligned with the hook members 60' of the multilayer coop column 40'.

The hydraulic cylinders C30 and C31 cooperatively act in manner similar to that previously described with respect to the "A" and "B" lifting cylinders of the first embodiment in sequentially lifting and tilting the coops 40' from top to bottom of the multilayer column of coops, so as to empty the coops, one at a time onto the conveyor 105'. In the figure illustrated, the cylinder C31 is activated by means of its control module 270 to engage the hook member 60a' of the uppermost coop and lifts the back of the coop to its tilted unloading position. Following completion of unloading of the chickens from the upper coop, the cylinder C30 is activated to operatively engage the hook member 60b' of the second coop member, tilting the second coop into supportive engagement with the uppermost coop, and enabling release of the C31 cylinder hook 145 from the coop hook 60a'.

Following completion of unloading of chickens from the second coop, the C31 cylinder piston is lowered to engage the hook 60c' of the third from the top coop, and to lift it into supportive engagement with the bottom of the second coop, as illustrated in FIG. 26. The process is continued until all of the coops in the column have been emptied onto the conveyor 105'. As with the first embodiment, the mounting platform 104' is successively moved in stepped manner to successively lower positions so as to address the gate of that coop to be next unloaded, and the coop gate opening assembly operates in manner identical to that previously described with respect to the first embodiment. When all of the coops of the column have been emptied, the platform 104' is raised, and the cylinder C31 which is still engaged to the lowermost coop hook 60'e is activated to gently tip back the entire column of coops to their initial "stacked" condition on the pallet 140. Cylinder C31 is then disconnected from hook 60'e and cylinder C32 is energized to raise beam 124 and its supported by cylinders C30 and C31 in a position so as to allow the emptied coop column to be removed from the loading dock and be replaced with another loaded coop column.

A third embodiment of the invention is illustrated with reference to FIGS. 30–39. This embodiment of the invention is fundamentally the same in operation as that of the first embodiment, except that the central support assembly 15 of the transport truck has been deleted, along with its associated coop lock mechanism 30. Therefore, the entire central portion between the "left" and "right" columns of coops on the support truck is "open", which allows for vertical insertion of the entire lifting cylinder bodies therebetween. With such embodiment, the coops would have to be anchored down to the transport vehicle bed during transport, by other appropriate means, such as by tie-down straps or the like. The third embodiment of the invention also differs from the first embodiment in that the lift rod members 60 of the first embodiment have been eliminated, and replaced by hook means which form an integral part of the upper back portions of the coops (see FIG. 38).

Figure 30:
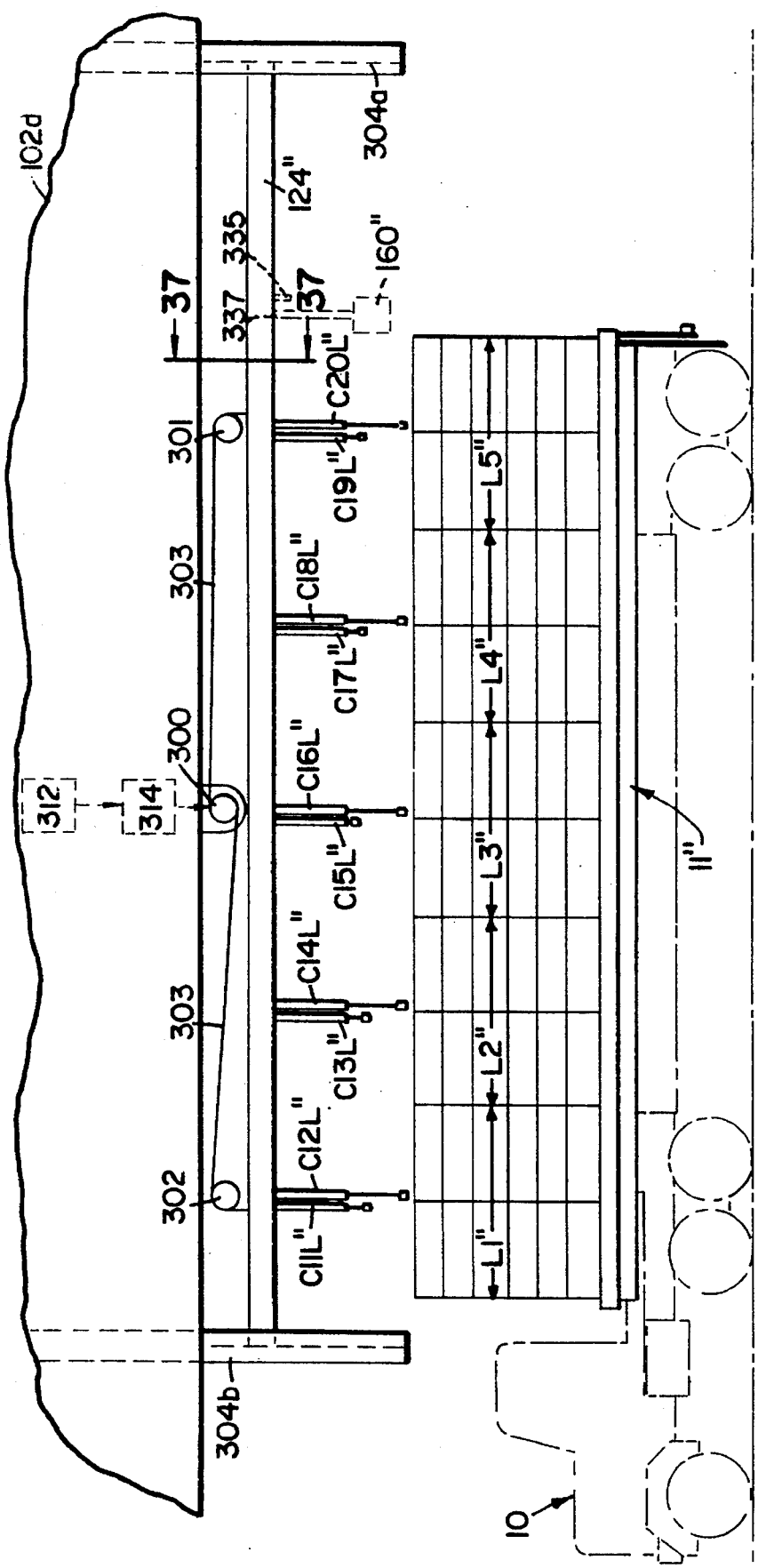
FIG. 30 is a diagrammatic view of a third embodiment of the invention, illustrating a vertically movable overhead beam and cylinder lifting assembly operatively positioned above a transport truck loaded with multilayer coop columns.
Figure 39:
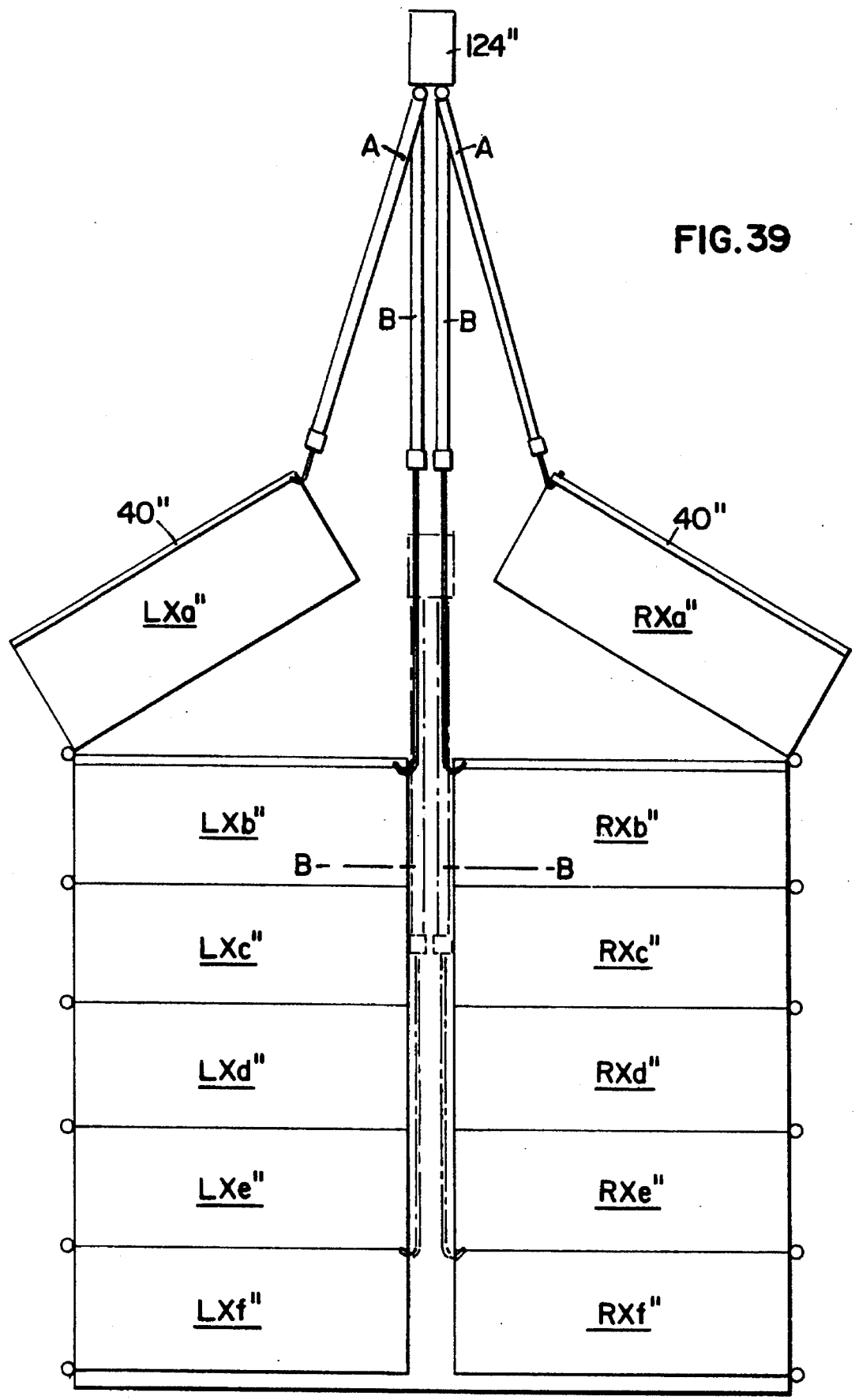
FIG. 39 is a diagrammatic end view of the multilayer transport coops of FIG. 30, illustrating their cooperative alignment with the hydraulic coop lifting cylinders, and illustrating the uppermost coops of the opposed coop columns lifted in unloading position.

Referring to FIGS. 38–39, those components illustrated which have counterparts in the first embodiment, are designated by the same numbers as those of the first embodiment, followed by a double prime designation. A transport truck 10" having a flatbed trailer 11" is loaded with a plurality of multilayer coop columns, in manner similar to that of the FIG. 1 first embodiment, except that there is no central support structure 15 on the truck. As illustrated in FIG. 30, there are five multilayer columns of coops on the "left" side of the truck, indicated at L1" through L5", from front to back. The truck 10" is illustrated as it would operatively appear when positioned for unloading within an unloading dock area. For simplicity, the side support platforms 104 with their associated conveyor assemblies and gate opening assemblies have been deleted from the figure. The stationary support beam 124 of the first embodiment has been replaced in the third embodiment by a vertically movable support beam 124". Vertical movement of the support beam 124" is accomplished by means of a cable winch motor assembly, generally illustrated at 300 which moves a pair of cables 303 over rear and forward cable pulleys 301 and 302 respectively. The ends of the cables 303 are secured to the beam 124" such that as the winch motor assembly 300 turns, both ends of the support beam 124" are simultaneously raised or lowered. The opposite ends of the support beam 124"0 are slidably retained by a pair of vertical guide channel members 304a and 304b. The vertical guide channel members 304 are slotted to slidably accept a centrally disposed finger cam portion 124a" member of the beam 124". The length of the vertical guide channels is sized to accommodate the height of the multilayer coop columns carried by the transport truck (FIG. 32). In a preferred embodiment, the length of the guide channels 304 is 88 inches to accommodate a six coop column wherein the individual coops are 16 inches in height. In the preferred embodiment, the rearmost guide channel 304a has a vertical adjustment plate 307 attached to one side thereof, and adjustably secured to the guide channel 304a by means of a pair of bolts 308 retained in slots 307a of the plate 307. A plurality of spaced arm members 310a–310f extend in cantilevered manner from the adjustment plate 307 and into close proximity with the front surface of the support beam 124". An electrical contact 312a–312f is mounted to each of the arm members 310a–310f respectively, for engaging the support beam 124", and for providing a vertical position indication for the beam. The electrical contacts 312 are operatively connected with a controller 314 for the motor winch assembly 300 to provide accurate vertical incremented movement of the beam 124" as guided by its vertical guide channels 304. Longitudinal movement of the beam 124" relative to its vertical guide channels 304 is provided by the beam's finger cam sections 124a". In the preferred embodiment, the cam members 124a" are eight inches in length, and provide for a six inch longitudinal movement of the support bar 124" relative to the vertical guide channels 304, as illustrated in varied longitudinal positions in FIG. 32.

The support bar 124" carries a plurality of lift cylinders in manner similar to that described with respect to the first embodiment of the invention. A pair of such lift cylinders is associated with each column of coops to be emptied on the transport vehicle bed. Therefore, there are two such lift cylinders for each column of coops on the left side of the transport vehicle, and two lift cylinders for each column of coops on the right side of the transport vehicle. Those cylinders illustrated in FIG. 30 are for lifting the coop columns on the "left" side of the load. The cylinders for lifting the coop columns on the "right" side of the load are positioned immediately behind the cylinders illustrated in FIG. 30, and are not visible in the figure. As with the lift cylinders for the first embodiment of the invention, each pair of lift cylinders has an "A" lift cylinder and a "B" lift cylinder. In the preferred embodiment, the "A" lift cylinders are disposed toward the rear of the load; whereas the "B" lift cylinders are disposed more toward the front side of the load. In the preferred embodiment, the coop lift cylinders are 48 inch long hydraulic cylinders having a 46 inch stroke, and have cylinder bodies of 1½ inches in diameter, such that two opposed cylinders (as illustrated in FIG. 37) can cooperatively slide down between the "left" and "right" columns of coops on the transport vehicle (as illustrated in FIG. 39). The support bar 124" is movable from its "Up" position (FIG. 32) down to its "5th" position, in incremented manner, for enabling the "A" and "B" cylinders attached thereto to access the various layers or rows of coops to be lifted. Such sequential movement and the "reach" of the lifting cylinders is illustrated in FIGS. 33A–33E. When the beam is positioned in its "1st" position, the lift cylinders can access the uppermost and the second coop layers; whereas when the beam is in its lowermost (5th) position, the lift cylinders can access the fifth and lowermost coop levels.

Each of the lift cylinders C11"–C20" has a "J-shaped" hook member 132" attached to its piston rod for liftably engaging the upper support bar 43t" of the coop 40". The lift hooks 132" of the "A" and "B" lift cylinders for any dual coop, engage the upper channel 43t" on either side of the coop centerline support 44 (see FIG. 15). The back mesh of the coop 40" is recessed below the area where the hook 132" engages the coop support bar, to enable the lifting hook 132" to gain clamping access to the support bar 43t". A guide ramp plate 320 is welded to the back of each coop (FIG. 38) and is vertically aligned with the lifting hooks 132" of the "A" and "B" cylinders, to guide the lift hook 132" into engagement with the upper support bar 43t" of the coop 40".

The support beam 124" has a plurality of outside rod hangers 322 mounted therealong for rotatably supporting a pipe or rod 323 which longitudinally extends along the support beam 124" from a position rearward of the transport vehicle load to the forward pairs of lift cylinders C11" and C12". Similarly, a plurality of inside support hangers 324 extend downwardly from the support beam 124" at positions disposed therealong to rotatably support a pair of longitudinally extending support rods or pipes 325. The outer rod members 323 have a plurality of U-shaped cylinder engaging brackets 330 disposed therealong such that one each of such brackets 330 is configured to operatively engage the "outside" surface of the "A" and "B" lifting cylinder bodies. The outside cylinder engaging brackets 330 are pivotally movable with their support rods 323 toward and away from engagement with their associated lift cylinders, as illustrated in FIG. 34. Similarly, the inside support rods 325 have mounted thereto a plurality of U-shaped "inside" cylinder engaging brackets 332 disposed along their support rods 325 for engaging each pair of "A" and "B" lift cylinders along their inside cylinder body surfaces. The inside cylinder engaging brackets 332 are pivotally movable with their associated support rods 325 toward and away from engagement with their associated lift cylinders, as illustrated in FIG. 34. The outside brackets 330 are operable to push the lift cylinders and their associated lift hooks toward the center of the support beam 124" so as to release their associated support hooks 132" from engagement with the coops. Conversely, the inside brackets 332 are operable to push the lift cylinders and their associated lift hooks 132" in an outward direction, so as to engage the lift hooks 132" with the coop receptor members. The outer support rods 323 extend in the rearward direction (of the transport vehicle) to a position just behind the support vehicle and in close proximity with the control panels 160", where they terminate in control levers 335. The control levers 335 have pull cords 335a associated therewith to permit an operator to pull down on the levers 335 to rotate the support rods 323. Similarly, the support rods 325 extend in the rearward direction of the transport vehicle to a position just spaced rearward therefrom and terminate at a pair of control levers 337 with associated pull cords 337a for enabling an operator to rotate the support rods 325 so as to operatively move the inner brackets 332. The operator levers 335 and 337 are sufficiently longitudinally spaced from one another so as to enable uninterrupted actuation respectively thereof.

Figure 33A:
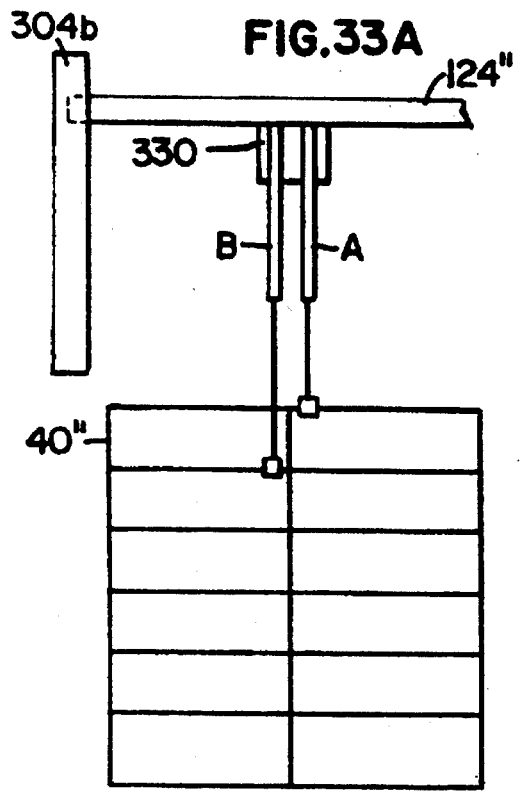
FIG. 33A is a diagrammatic view illustrating the overhead beam of FIG. 30 in a first position, with its associated lifting cylinders positioned for lifting the uppermost and second layers of coops.
Figure 33B:
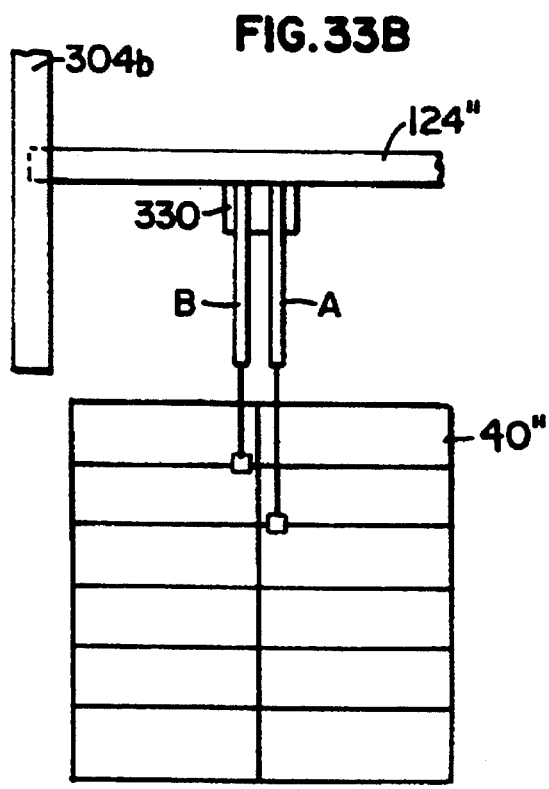
FIG. 33B is a diagrammatic view illustrating the overhead beam of FIG. 30 in a second position, with its associated lifting cylinders positioned for lifting the second and third layers of coops.
Figure 33C:
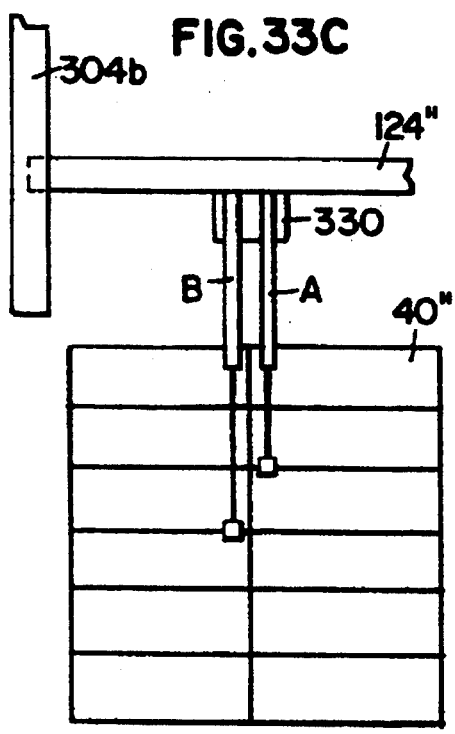
FIG. 33C is a diagrammatic view illustrating the overhead beam of FIG. 30 in a third position, with its associated lifting cylinders positioned for lifting the third and fourth layers of coops.
Figure 33D:
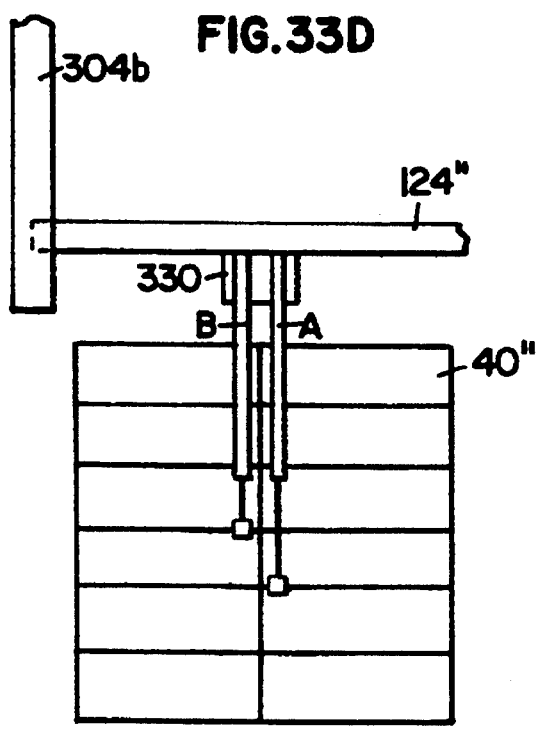
FIG. 33D is a diagrammatic view illustrating the overhead beam of FIG. 30 in a fourth position, with its associated lifting cylinders positioned for lifting the fourth and fifth layers of coops.

Unloading coops of a transport vehicle by use of the third embodiment is similar to that of the first embodiment in all respects except for actuation of the coop lift cylinders. After the transport vehicle has been positioned in the unloading dock area and the conveyor assemblies have been appropriately positioned for unloading of the uppermost coop layer, the operator energizes the winch and motor assembly 300 so as to cause the support beam 124" to move from its uppermost position to its "1st" position. The microswitch 312b will provide an automatic indication when the support beam is properly aligned in the 1st position, and will deenergize the winch/motor assembly 300. When in the first position, the "A" and "B" lift cylinders will have their pistons positioned as illustrated in FIG. 33A. The operator then selectively activates the "A" cylinders of the lifting mechanism to lower their hook members to engage the upper channel member of the uppermost coops of the multilayer coop assemblies. If the hook members of the lifting cylinders need to be urged into engagement with the rear panels of the coops, the operator can accomplish such task by pulling down on the activator levers 337. Once the lifting hooks are engaged with the uppermost coops, the "A" cylinders are energized so as to lift the backs of the top coops, tilting the coops into an unloading position, as illustrated in FIG. 39. The coops are then emptied as previously described with respect to the first embodiment.

After the uppermost layer of coops have been emptied, the "B" cylinder pistons and their associated hooks are lowered into operative engagement with the upper support members of the second row or layer of coops, which are then emptied according to the general procedures outlined with respect to the first embodiment of the invention. After the second layer of coops has been emptied, the "A" cylinders are released from engagement with the uppermost layer of coops, with assistance of the outer brackets 330, and the main support beam 124" is lowered to its 2nd position (FIG. 32) while the "B" cylinders continue to support the first and second coop layers in their tilted positions. This requires cooperative action in lowering the support beam and in energizing the "B" cylinders to take up the slack caused by the lowering operation. When the beam 124" is in its 2nd position, the "A" cylinders can be lowered to operatively engage the third row of coops, for emptying thereof in manner previously described. Such successive energization of the "A" and "B" lifting cylinders, in cooperation with successive lowering of the support beam 124" enables the columns of multilayer coops to be successively emptied from top down, as previously described with respect to the first embodiment. FIG. 39 illustrates, in phantom, the lift cylinders as they would appear disposed between the left and right columns of multilayer coops after they have been returned to their resting position on the bed 11" of the truck, showing how the cylinder bodies fit between the central gap defined by the left and right columns of coops.

While the invention has been described with respect to several different embodiments of the invention, and with respect to specific types of components used therein, it will be understood by those skilled in the art, that the invention is not to be limited in any manner by the specifics of either the embodiments or the components described herein. Such embodiments and components have been described to illustrate clear examples of how the principles of the invention could be specifically applied. All alternatives and modifications of the foregoing are intended to be covered within the scope of the appended claims.

What is claimed is:

1. A method of unloading a multilayered container having a plurality of similar containers vertically aligned upon one another to form an integral vertical container column, wherein successive ones of said vertically aligned containers are hinged along horizontal axes to one another along one side of the column, defining a discharge side of the column, with the lowermost container being hinged to a support base for the column, comprising:

(a) arranging a discharge collector of a type suitable to collect the contents of the containers in general vertical alignment at said discharge side, with a bottom of the uppermost container;

(b) opening the discharge side of the uppermost container to expose its contents to the discharge collector;

(c) tilting the uppermost container about its lower hinged edge at its discharge side to a tilted position, thereby causing the contents thereof to gently move by gravity from the tilted container and into said discharge collector;

(d) moving said discharge collector into general vertical alignment at said discharge side with a bottom of the next lower container;

(e) opening the discharge side of the next lower container;

(f) tilting the next lower container about its lower hinged end at its discharge side to a tilted position, thereby causing the contents thereof to move by gravity from the tilted container and into said discharge collector; and (g) successively repeating the steps of: moving and aligning the discharge collector to successively lower containers; opening the discharge sides of those containers with which the discharge collector is aligned; and tilting those containers having opened discharge sides about their lower hinged ends to discharge their contents into the discharge collector, until the contents of the entire container column have been emptied into the discharge collector.

2. The method of claim 1, including the step of maintaining the uppermost container in its tilted position after emptying its contents, while tilting the next lower container to its tilted position; and supporting the uppermost container in its tilted position by the next lower container when said next lower container attains its fully tilted position.

3. The method of claim 2, including the step of maintaining each previously tilted container in its tilted position while tilting that container currently being emptied to its tilted position, and supporting all previously emptied and tilted containers of the column by the lowermost, last tilted container.

4. The method of claim 1, wherein said tilted containers are tilted about their hinged edges through an angle of greater than or equal to 20 degrees.

5. The method of claim 4, wherein said tilted containers are tilted about their hinged edges through an angle of greater than or equal to 30 degrees.

6. The method as recited in claim 1, including a first step of moving said container column from a transport vehicle to an unloading station, such that said discharge side thereof operatively addresses said discharge collector.

7. The method of claim 1, wherein each of said containers includes a gate at its discharge side, and wherein the steps of opening said discharge sides of said containers comprises pivotally lifting said gates to an open position, such that the respective gates lie generally perpendicular to a general plane of said discharge side.

8. The method of claim 1, wherein the step of opening said discharge sides of said containers comprises hydraulically opening said discharge sides of said containers.

9. The method of claim 1, further including:

providing said containers with lifting means at a back side thereof oppositely disposed from said discharge side; and wherein said steps of tilting said containers comprises aligning and engaging hydraulic cylinder means with said lifting means, and activating said hydraulic cylinder means to successively arcuately lift the back sides of said containers, one at a time, to empty their respective contents, as described.

10. The method of claim 1, wherein said discharge collector includes moving conveyor means, and further including the step of activating said conveyor means to move the emptied contents of said containers to a location remote from said container column.

11. The method as recited in claim 1, including the step of returning the entire column of tilted containers to their original vertically aligned position after the contents of the lowermost container has been emptied onto said discharge collector.

12. The method as recited in claim 11, wherein the step of returning the column of tilted containers comprises gradually arcuately tilting the entire column of containers about the hinged axis of the lowermost container until said container column is reseated to the support base for the column.

13. A method of unloading a row of multilayered container columns, each container column having a plurality of similar containers vertically aligned upon one another to form an integral vertical container column, wherein successive containers are hinged along horizontal axes to one another along a discharge side of the column, with the lowermost container being hinged to a support base for the column, and such that the respective discharge sides of all columns of the row are generally aligned in a common plane, comprising:

(a) vertically arranging a discharge collector of a type suitable to collect contents of the containers, in general alignment at said discharge side with bottoms of the uppermost containers of the row of container columns;

(b) opening the discharge sides of the uppermost containers of the row of container columns, to expose their contents to the discharge collector;

(c) tilting the uppermost containers of the row of container columns about their respective lower hinged edges at their discharge sides to a tilted position, thereby causing contents of the uppermost containers to move by gravity from the tilted containers and into said discharge collector;

(d) vertically aligning said discharge collector at said discharge side with the bottoms of the next lower containers of the row of container columns;

(e) opening the discharge sides of the next lower containers;

(f) tilting the next lower containers about their respective lower hinged edges at their discharge sides to a tilted position, thereby causing contents thereof to gently move by gravity from the tilted containers and into said discharge collector; and (g) successively repeating the steps of: vertically operatively aligning the discharge collector into alignment with successively lower containers of the row of container columns; opening the discharge sides of those containers aligned with the discharge collector; and tilting those aligned containers with open discharge sides about their lower hinged edges to discharge their contents into the discharge collector, until the contents of the entire row of container columns have been emptied into the discharge collector.

14. The method as recited in claim 13, wherein the step of tilting the uppermost containers comprises simultaneously tilting all of the uppermost containers of the row of container columns to empty their respective contents.

15. The method as recited in claim 14, wherein the step of tilting the next lower containers comprises simultaneously tilting all of the next lower containers of the row of container columns, to simultaneously empty their respective contents; and wherein each successive step of tilting successively lower containers comprises simultaneously tilting all containers of that level of containers being emptied.

16. The method as recited in claim 13, wherein the step of tilting the uppermost containers comprises selectively tilting the uppermost containers of the row of container columns, to selectively discharge the contents of the upper containers into the discharge collector.

17. The method as recited in claim 16, wherein the step of selectively tilting the uppermost containers comprises sequentially tilting the containers of the row of container columns, to sequentially discharge their contents, one-at-a-time into the discharge collector.

18. The method as recited in claim 13, further including a first step of moving the entire row of container columns into a position wherein the discharge sides thereof operatively address said discharge collector.

19. The method as recited in claim 13, including an initial step of positioning a pair of said rows of container columns back-to-back upon a transport vehicle bed, such that the respective discharge sides of each row are vertically aligned with opposite longitudinal sides of the transport vehicle bed, and such that the transport vehicle bed forms said support base for all of the container columns; and wherein the method of unloading such containers comprises unloading the containers of both rows of the pair of container columns from both sides of the transport vehicle without removing the containers from the vehicle.

20. The method as recited in claim 19, comprising: simultaneously unloading the pair of container column rows in the manner described from both sides of the transport vehicle.

21. The method as recited in claim 20, further including the step of simultaneously securing the entire row of container columns in the vertical direction thereof, to the support base, after the emptied container columns have been returned to their original vertically aligned positions.

22. The method as recited in claim 19, wherein the step of tilting the container columns comprises: aligning overhead lifting apparatus with a longitudinal centerline of the transport vehicle bed; selectively lowering said lifting apparatus into lifting engagement with the respective containers to be emptied along said longitudinal centerline; and selectively activating said lifting apparatus to tilt said containers as described.

23. The method as recited in claim 13, including the step of returning tilted container columns of said row thereof to their original vertically aligned positions in engagement with said support base after the contents of the lowermost containers thereof have been emptied onto said discharge collector.

* * * * *